US008385308B2

(12) United States Patent
Cheng et al.

(10) Patent No.: US 8,385,308 B2
(45) Date of Patent: Feb. 26, 2013

(54) METHODS AND SYSTEMS FOR EXTENSIBLE EXTENDED INFORMATION ELEMENT MAPPING

(75) Inventors: Steven D. Cheng, San Diego, CA (US); Guangming Carl Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 12/463,401

(22) Filed: May 10, 2009

(65) Prior Publication Data

US 2010/0118772 A1    May 13, 2010

Related U.S. Application Data

(60) Provisional application No. 61/113,169, filed on Nov. 10, 2008.

(51) Int. Cl.
  *H04W 4/00* (2009.01)
  *H04B 7/208* (2006.01)

(52) U.S. Cl. .......................... 370/344; 370/328

(58) Field of Classification Search ............... 370/310, 370/311, 328, 329, 338, 343, 344; 375/259, 375/260, 267; 455/403, 422.1, 436, 442
See application file for complete search history.

(56) References Cited

U.S. PATENT DOCUMENTS

| 7,299,048 | B2 * | 11/2007 | Lim et al. ..................... 455/442 |
| 7,400,898 | B2 * | 7/2008 | Kang et al. ................... 455/518 |
| 7,664,087 | B2 * | 2/2010 | Cho et al. ..................... 370/338 |
| 7,751,364 | B2 * | 7/2010 | Won et al. ..................... 370/329 |
| 7,796,547 | B2 * | 9/2010 | Etemad et al. ................ 370/328 |
| 7,864,721 | B2 * | 1/2011 | Zhang ........................... 370/311 |
| 2007/0206561 | A1 | 9/2007 | Son et al. |

FOREIGN PATENT DOCUMENTS

EP    1746855    1/2007

OTHER PUBLICATIONS

"IEEE Draft Standard for Local and metropolitan area networks Part 16: Air Interface for Broadband Wireless Access Systems, P802.16Rev2/D4," (Apr. 2008), IEEE Standards, XP002579317, pp. 1, 6.
International Search Report & Written Opinion—PCT/US2009/061205, International Search Authority—European Patent Office—May 27, 2010.
Kim, Ju Yeop et al: "Piggybacking Scheme of MAP IE for Minimizing MAC Overhead in the IEEE 802.16e OFDMA Systems," IEEE 66th Vehicular Technology Conference, 2007. IEEE Standards, (Sep. 1, 2007), pp. 284-288, XP031147411, ISBN: 978-1-4244-0.

* cited by examiner

*Primary Examiner* — Chi Pham
*Assistant Examiner* — Robert Lopata
(74) *Attorney, Agent, or Firm* — Tyler J. Overall

(57) ABSTRACT

Methods and apparatus for expressing two or more extended information elements (IEs) of a MAP message using a single Extended or Extended-2 Downlink Interval Usage Code (DIUC) or Uplink Interval Usage Code (UIUC) in an orthogonal frequency-division multiplexing (OFDM) or orthogonal frequency division multiple access (OFDMA) frame are provided. This enhancement, called extensible Extended IE mapping, allows the WiMAX network to include more IEs into the DL-MAP and UL-MAP messages as the IEEE 802.16 family of standards evolves. Without this enhancement, all of the new IEs may most likely have to be included in the data bursts, and a user terminal (e.g., a mobile station) cannot decode these data-burst IEs unless the user terminal receives the Downlink Channel Descriptor (DCD) message(s).

108 Claims, 22 Drawing Sheets

| FCH(DLFP)_Message_Format | |
|---|---|
| Used SCH bitmap:<br>A bitmap indicating which groups of SCH are used on the 1st PUSC zone and on PUSC zones in which 'use all SC' indicator is set to '0' in STC_DL_Zone_IE0. Value 1 means used by this segment and 0 means not used.<br>                      2048     1024     512     128<br>   bit 0: SCH Group 0   0~11(12)  0~ 5(6)  0~4(5)  0(1)<br>   bit 1: SCH Group 1  12~19( 8)  6~ 9(4)  NA      NA<br>   bit 2: SCH Group 2  20~31(12)  10~15(6)  5~9(5)  1(1)<br>   bit 3: SCH Group 3  32~39( 8)  16~19(4)  NA      NA<br>   bit 4: SCH Group 4  40~51(12)  20~25(6)  10~14(5)  2(1)<br>   bit 5: SCH Group 5  52~59( 8)  26~29(4)  NA      NA | 6 bits |
| Reserved: set to 0 | 1 bit |
| Repetition Coding Indication: on DL Map<br>No additional Rep=total1(0), 1 additional Rep=total2(1),<br>3 additional Rep=total4(2), 5 additional Rep=total6(3) | 2 bits |
| Coding Indication: on DL Map<br>DL Map shall be transmitted with QPSK at FEC rate 1/2<br>The BS ensures that DL Map (and other MAC msg required for SS operation) are sent with the mandatory coding scheme often enough to ensure uninterrupted operation of SS supporting only the mandatory coding scheme.<br><br>CC(0), BTC(1), CTC(2), ZTCC(3), CC w oINT(4), LDPC(5) | 3 bits |
| DL Map Length:<br>Defines the length in slots of the DL Map msg that follows immediately the DLFP, after repetition code is applied. | 8 bits |
| Reserved: set to 0 | 4 bits |

FIG. 4B

| Information Element | Size |
| --- | --- |
| Management Message Type = 2 | 8 bits |
| Frame Duration Code | 8 bits |
| Frame Number | 24 bits |
| DCD Count | 8 bits |
| Base Station ID | 48 bits |
| No. OFDMA Symbols in DL Subframe | 8 bits |
| DL-MAP_IE 1 | Variable |
| DL-MAP_IE 2 | Variable |
| ⋮ | |
| DL-MAP_IE n | Variable |
| Padding | 0 or 4 bits |

FIG. 5B

| Information Element | Size |
|---|---|
| Management Message Type = 3 | 8 bits |
| Reserved | 8 bits |
| UCD Count | 8 bits |
| Allocation Start Time | 32 bits |
| No. OFDMA Symbols in UL Subframe | 8 bits |
| UL-MAP_IE 1 | Variable |
| UL-MAP_IE 2 | Variable |
| ⋮ | |
| UL-MAP_IE N | Variable |
| Padding | 0 or 4 bits |

Extended DIUC assignment for DIUC = 15

| Extended DIUC (hexadecimal) | Usage |
|---|---|
| 00 | Channel Measurement IE |
| 01 | STC Zone IE |
| 02 | AAS DL IE |
| 03 | Data Location in Another BS IE |
| 04 | CID Switch IE |
| 05 | *Reserved* |
| 06 | *Reserved* |
| 07 | HARQ Map Pointer IE |
| 08 | PHYMOD DL IE |
| 09 | *Reserved* |
| 0A | Broadcast Control Pointer IE |
| 0B | DL PUSC Burst Allocation in Other Segment IE |
| 0C | PUSC ASCA ALLOC IE |
| 0D | H-FDD Group Switch IE |
| 0E | *Reserved* |
| 0F | UL Interference and Noise Level IE |

FIG. 9

Extended-2 DIUC assignment for DIUC = 14

| Extended-2 DIUC (hexadecimal) | Usage |
|---|---|
| 00 | MBS MAP IE |
| 01 | HO Anchor Active DL MAP IE |
| 02 | HO Active Anchor DL MAP IE |
| 03 | HO CID Translation MAP IE |
| 04 | MIMO in Another BS IE |
| 05 | Macro-MIMO DL Basic IE |
| 06 | Skip IE |
| 07 | HARQ DL MAP IE |
| 08 | HARQ ACK IE |
| 09 | Enhanced DL MAP IE |
| 0A | Closed-loop MIMO DL Enhanced IE |
| 0B | MIMO DL Basic IE |
| 0C | MIMO |
| 0D | Persistent HARQ DL MAP IE |
| 0E | AAS SDMA DL IE |
| 0F | Power Boosting IE |

FIG. 10

Extended UIUC assignment for UIUC = 15

| Extended UIUC (hexadecimal) | Usage |
|---|---|
| 00 | Power Control IE |
| 01 | *Reserved* |
| 02 | AAS UL IE |
| 03 | CQICH Allocation IE |
| 04 | UL Zone IE |
| 05 | UL-MAP Physical Modifier IE |
| 06 | *Reserved* |
| 07 | UL-MAP Fast Tracking IE |
| 08 | UL PUSC Burst Allocation in Other Segment IE |
| 09 | Fast Ranging IE |
| 0A | UL Allocation Start IE |
| 0B ... 0F | *Reserved* |

FIG. 11

Extended-2 UIUC assignment for UIUC = 11

| Extended-2 Type (hexadecimal) | Usage |
|---|---|
| 00 | CQICH Enahnced Allocation IE |
| 01 | HO Anchor Active UL-MAP IE |
| 02 | HO Active Anchor UL-MAP IE |
| 03 | Anchor BS Switch IE |
| 04 | UL Sounding Command IE |
| 05 | *Reserved* |
| 06 | MIMO UL Enahnced IE |
| 07 | HARQ UL MAP IE |
| 08 | HARQ ACKCH Region Allocation IE |
| 09 | MIMO UL Basic IE |
| 0A | Mini-subchannel allocation IE |
| 0B | UL_PC_Bitmap IE |
| 0C | Persistent HARQ UL MAP IE |
| 0D | FDD Paired Allocation IE |
| 0E | AAS SDMA UL IE |
| 0F | Feedback Polling IE |

FIG. 12

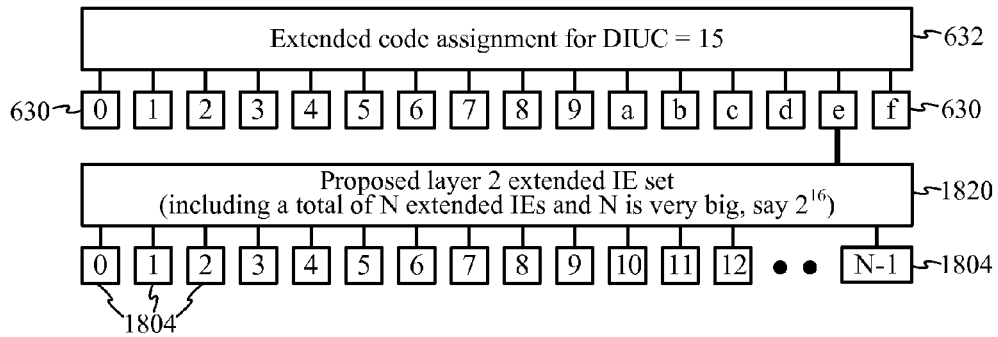

| Extended code assignment for DIUC = 15 | | |
|---|---|---|
| syntax | Size (bits) | note |
| Extended DIUC (value = e) | 4 | Proposed layer 2 extended IE set |
| Extended IE ID | 16 | Proposed layer 2 extended IE ID ($2^{16}$ IEs share this slot) |
| Size unit | 2 | 0: bit; 1: nibble; 2: byte; 3: word |
| Size of length | 4 | $2^{\text{the size of length}}$ is the maximal size unit of unspecified data |
| Size of unspecified data in size unit | variable | |
| Unspecified data | variable | |

| The proposed layer 2 extended IE schema | | | | |
|---|---|---|---|---|
| Extended IE ID | Size unit | Size of length | Unspecified data | note |
| 0 | 2 | 1 | variable | Ranging traffic info |
| 1 | 0 | 14 | variable | Frames between the current frame and the coming DCD message |
| 2 | 0 | 14 | variable | Frames between the current frame and the coming UCD message |
| 3 | 0 | 15 | variable | Frames between the current frame and the coming MOB_NBR-ADV message |

FIG. 18

METHODS AND SYSTEMS FOR EXTENSIBLE EXTENDED INFORMATION ELEMENT MAPPING

CLAIM OF PRIORITY

This application claims the benefit of priority from U.S. Provisional Patent Application Ser. No. 61/113,169, entitled "Extensible Extended IE Mapping for WIMAX" and filed Nov. 10, 2008, which is assigned to the assignee of this application and is fully encorporated herein by reference for all purposes.

TECHNICAL FIELD

Certain embodiments of the present disclosure generally relate to wireless communication and, more particularly, to expressing MAP information elements (MAP IEs) in orthogonal frequency-division multiplexing (OFDM) or orthogonal frequency division multiple access (OFDMA) frames.

SUMMARY

Certain embodiments of the present disclosure generally relate to expressing two or more extended information elements (IEs) of a MAP message using a single Extended or Extended-2 Downlink Interval Usage Code (DIUC) or Uplink Interval Usage Code (UIUC) in an orthogonal frequency-division multiplexing (OFDM) or orthogonal frequency division multiple access (OFDMA) frame. This enhancement, called extensible Extended IE, allows the WiMAX network to include more IEs into the DL-MAP and UL-MAP messages as the IEEE 802.16 standards evolve and new IEs are added.

Certain embodiments of the present disclosure provide a method for conveying control messages in wireless communications. The method generally includes expressing two or more extended IEs of a MAP message using a single Extended or Extended-2 DIUC or UIUC, generating an OFDM or OFDMA frame having the MAP message with the two or more extended IEs, and transmitting a signal based on the OFDM or OFDMA frame.

Certain embodiments of the present disclosure provide an apparatus for conveying control messages in wireless communications. The apparatus generally includes means for expressing two or more extended IEs of a MAP message using a single Extended or Extended-2 DIUC or UIUC, means for generating an OFDM or OFDMA frame having the MAP message with the two or more extended IEs, and means for transmitting a signal based on the OFDM or OFDMA frame.

Certain embodiments of the present disclosure provide an apparatus for conveying control messages in wireless communications. The apparatus generally includes logic for expressing two or more extended IEs of a MAP message using a single Extended or Extended-2 DIUC or UIUC, logic for generating an OFDM or OFDMA frame having the MAP message with the two or more extended IEs, and logic for transmitting a signal based on the OFDM or OFDMA frame.

Certain embodiments of the present disclosure provide an apparatus for conveying control messages in wireless communications. The apparatus generally includes at least one processor and a memory coupled to the at least one processor. The processor is typically configured to express two or more extended IEs of a MAP message using a single Extended or Extended-2 DIUC or UIUC, generate an OFDM or OFDMA frame having the MAP message with the two or more extended IEs, and transmit a signal based on the OFDM or OFDMA frame.

Certain embodiments of the present disclosure provide a computer-program product for conveying control messages in wireless communications. The computer-program product typically includes a computer-readable medium having instructions stored thereon, the instructions being executable by one or more processors. The instructions generally include instructions for expressing two or more extended IEs of a MAP message using a single Extended or Extended-2 DIUC or UIUC, instructions for generating an OFDM or OFDMA frame having the MAP message with the two or more extended IEs, and instructions for transmitting a signal based on the OFDM or OFDMA frame.

Certain embodiments of the present disclosure provide a method for conveying control messages in wireless communications. The method generally includes receiving a signal based on an OFDM or OFDMA frame, extracting a MAP message from the OFDM or OFDMA frame, and reading two or more extended IEs from the MAP message, wherein the two or more extended IEs have the same Extended or Extended-2 DIUC or UIUC.

Certain embodiments of the present disclosure provide an apparatus for conveying control messages in wireless communications. The apparatus generally includes means for receiving a signal based on an OFDM or OFDMA frame, means for extracting a MAP message from the OFDM or OFDMA frame, and means for reading two or more extended IEs from the MAP message, wherein the two or more extended IEs have the same Extended or Extended-2 DIUC or UIUC.

Certain embodiments of the present disclosure provide an apparatus for conveying control messages in wireless communications. The apparatus generally includes logic for receiving a signal based on an OFDM or OFDMA frame, logic for extracting a MAP message from the OFDM or OFDMA frame, and logic for reading two or more extended IEs from the MAP message, wherein the two or more extended IEs have the same Extended or Extended-2 DIUC or UIUC.

Certain embodiments of the present disclosure provide an apparatus for conveying control messages in wireless communications. The apparatus generally includes at least one processor and a memory coupled to the at least one processor. The processor is typically configured to receive a signal based on an OFDM or OFDMA frame, extract a MAP message from the OFDM or OFDMA frame, and read two or more extended IEs from the MAP message, wherein the two or more extended IEs have the same Extended or Extended-2 DIUC or UIUC.

Certain embodiments of the present disclosure provide a computer-program product for conveying control messages in wireless communications. The computer-program product typically includes a computer-readable medium having instructions stored thereon, the instructions being executable by one or more processors. The instructions generally include instructions for receiving a signal based on an OFDM or OFDMA frame, instructions for extracting a MAP message from the OFDM or OFDMA frame, and instructions for reading two or more extended IEs from the MAP message, wherein the two or more extended IEs have the same Extended or Extended-2 DIUC or UIUC.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/OFDMA frame for Time Division Duplex (TDD) and the format of the Frame Control Header (FCH) contained therein, the FCH including downlink Frame Prefix (DLFP) information, in accordance with certain embodiments of the present disclosure.

FIGS. 5A and 5B illustrate the format of and the bit size of entries in a downlink map (DL-MAP) message with a generic DL-MAP information element (IE), in accordance with certain embodiments of the present disclosure.

FIG. 9 illustrates Extended DIUC (Downlink Interval Usage Code) assignments for DIUC=15 (as provided in Table 323 of the IEEE P802.16Rev2/D5-2008 draft, corresponding to Table 277a in the IEEE 802.16e-2005 standard), in accordance with certain embodiments of the present disclosure.

FIG. 10 illustrates Extended-2 DIUC assignments for DIUC=14 (as provided in Table 325 of the IEEE P802.16Rev2/D5-2008 draft, corresponding to Table 277c in the IEEE 802.16e-2005 standard), in accordance with certain embodiments of the present disclosure.

FIG. 11 illustrates Extended UIUC assignments for UIUC=15 (as provided in Table 377 of the IEEE P802.16Rev2/D5-2008 draft, corresponding to Table 290a in the IEEE 802.16e-2005 standard), in accordance with certain embodiments of the present disclosure.

FIG. 12 illustrates Extended-2 UIUC assignments for UIUC=11 (as provided in Table 379 of the IEEE P802.16Rev2/D5-2008 draft, corresponding to Table 290c in the IEEE 802.16e-2005 standard), in accordance with certain embodiments of the present disclosure.

FIG. 18 illustrates an example extensible extended IE dynamic mapping scheme using DIUC=15 and Extended DIUC=14 (0xE in hexadecimal) to introduce 65,536 new extended IEs with the size of length and the size of unspecified data being variable among the extended IEs, in accordance with certain embodiments of the present disclosure.

DETAILED DESCRIPTION

Figure 1:
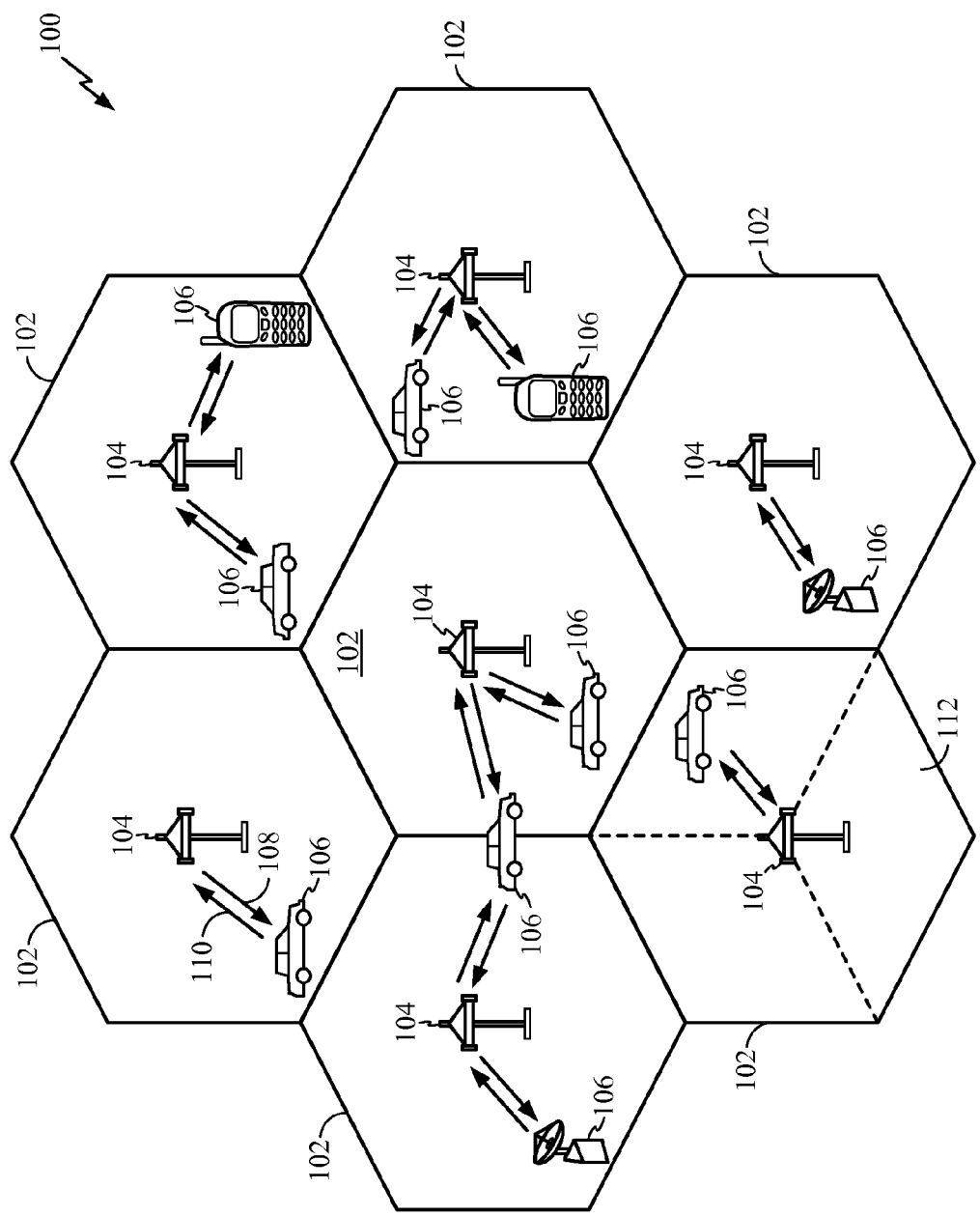
FIG. 1 illustrates an example wireless communication system, in accordance with certain embodiments of the present disclosure.

Certain embodiments of the present disclosure provide techniques and apparatus for expressing two or more extended information elements (IEs) of a MAP message using a single Extended or Extended-2 Downlink Interval Usage Code (DIUC) or Uplink Interval Usage Code (UIUC) in an orthogonal frequency-division multiplexing (OFDM) or orthogonal frequency division multiple access (OFDMA) frame. This enhancement, called extensible Extended IE mapping, allows the WiMAX network to include more IEs into the DL-MAP and UL-MAP messages as the Institute of Electrical and Electronics Engineers (IEEE) 802.16 family of standards evolves. Without this enhancement, all of the new IEs may most likely have to be included in the data bursts, and a user terminal cannot decode these data-burst IEs unless the user terminal receives the Downlink Channel Descriptor (DCD) message(s).

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations. Such an RF signal from a base station includes an overhead load, in addition to the data load (voice and other data), for various communication management functions. Each mobile station (MS) processes the information in the overhead load of each received signal prior to processing the data.

Under the current versions of the IEEE 802.16x standard for the OFDMA systems, every downlink subframe from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis.

Therefore, a receiver, such as an MS, first decodes the FCH to determine the position of the DL-MAP, decodes the DL-MAP of the corresponding position, and then extracts the data including the UL-MAP as the first DL data burst. Due to the nature of the information in the DL-MAP (UL-MAP), if the reception of the DL-MAP (UL-MAP) fails or the DL-MAP (UL-MAP) is decoded incorrectly, the following downlink (uplink) operations on the receiver side cannot be properly executed. Accordingly, proper interpretation of the DL-MAP and the UL-MAP is important to OFDM and OFDMA system operation.

Although many of the examples illustrate extended IEs for a DL-MAP, certain embodiments of the present disclosure may apply to extended IEs for a UL-MAP, as well.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16 is an emerging standard organization to define an air interface for fixed and mobile broadband wireless access (BWA) systems. IEEE 802.16 approved "IEEE P802.16d/D5-2004" in May 2004 for fixed BWA systems and published "IEEE P802.16e/D12 October 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively. Starting in 2007, the organization has been developing the second revision of the IEEE 802.16 standard, following the IEEE 802.16-2001 and IEEE 802.16-2004 standards, which will consolidate IEEE 802.16-2004 and IEEE 802.16e-2005, among others. One of the unapproved published drafts is IEEE P802.16Rev2/D5, published in June 2008.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
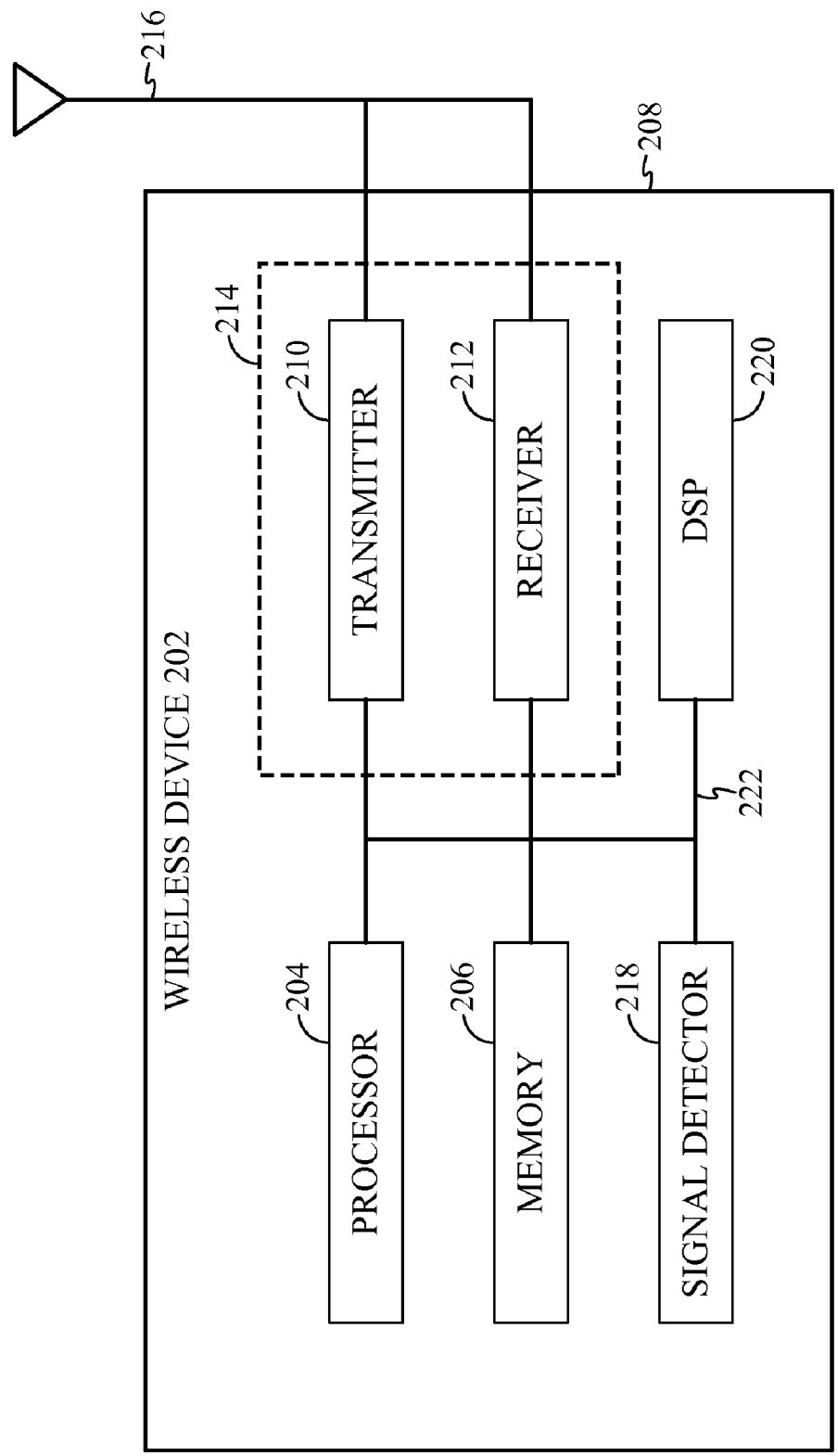
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
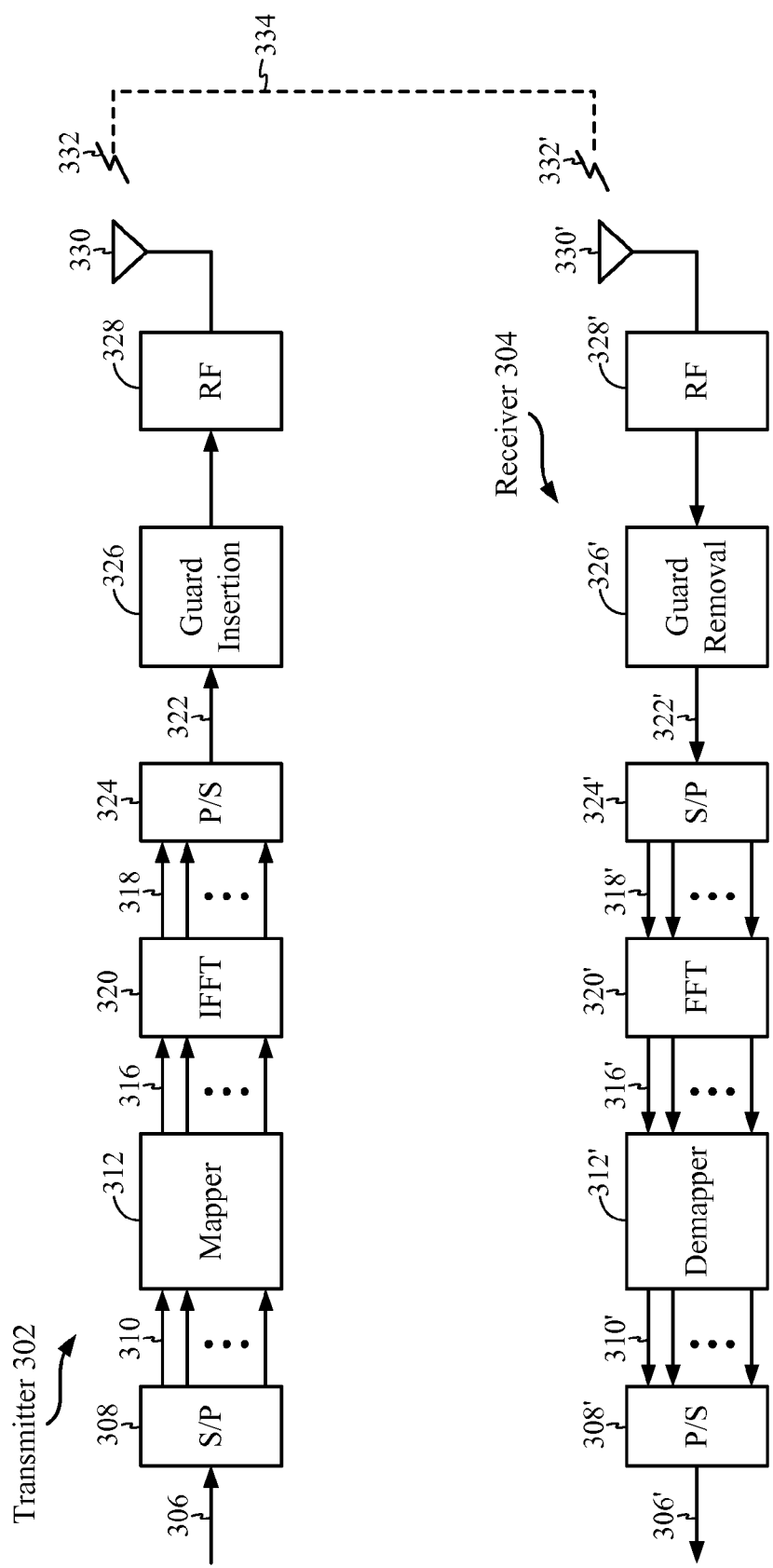
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary OFDM/OFDMA Frame

Figure 4A:
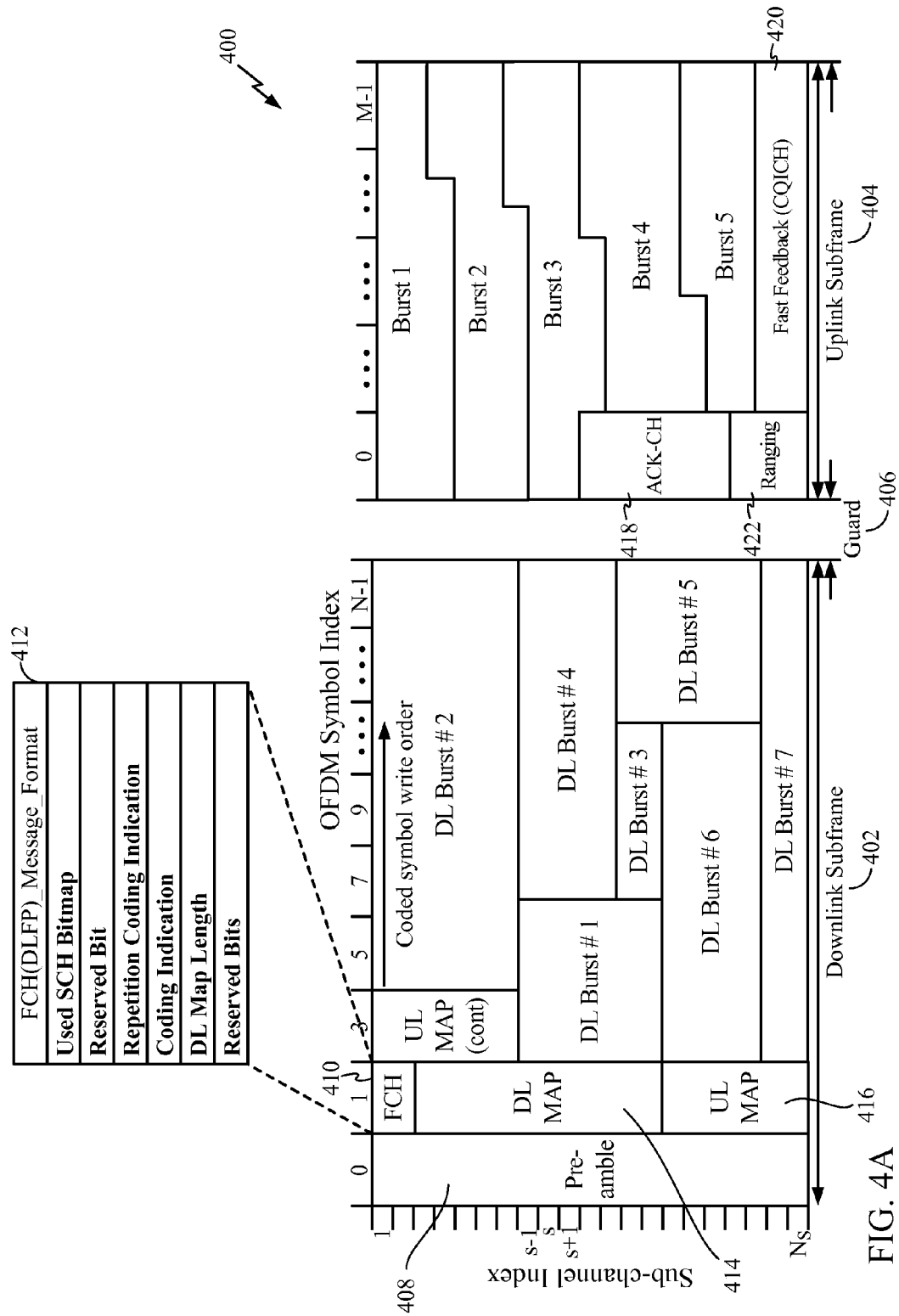

Referring now to FIG. 4A, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/

OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, ... may indicate that segment 0 is to be used, carriers 1, 4, 7, ... may indicate that segment 1 is to be used, and carriers 2, 5, 8, ... may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

As illustrated in FIG. 4B, the DLFP 412 for Mobile WiMAX may comprise six bits for the used subchannel (SCH) bitmap 412a, a reserved bit 412b set to 0, two bits for the repetition coding indication 412c, three bits for the coding indication 412d, eight bits for the MAP message length 412e, and four reserved bits 412f set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify data burst allocation and other control information for the DL and UL subframes 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary DL-MAP and DL-MAP IEs

Figure 5A:
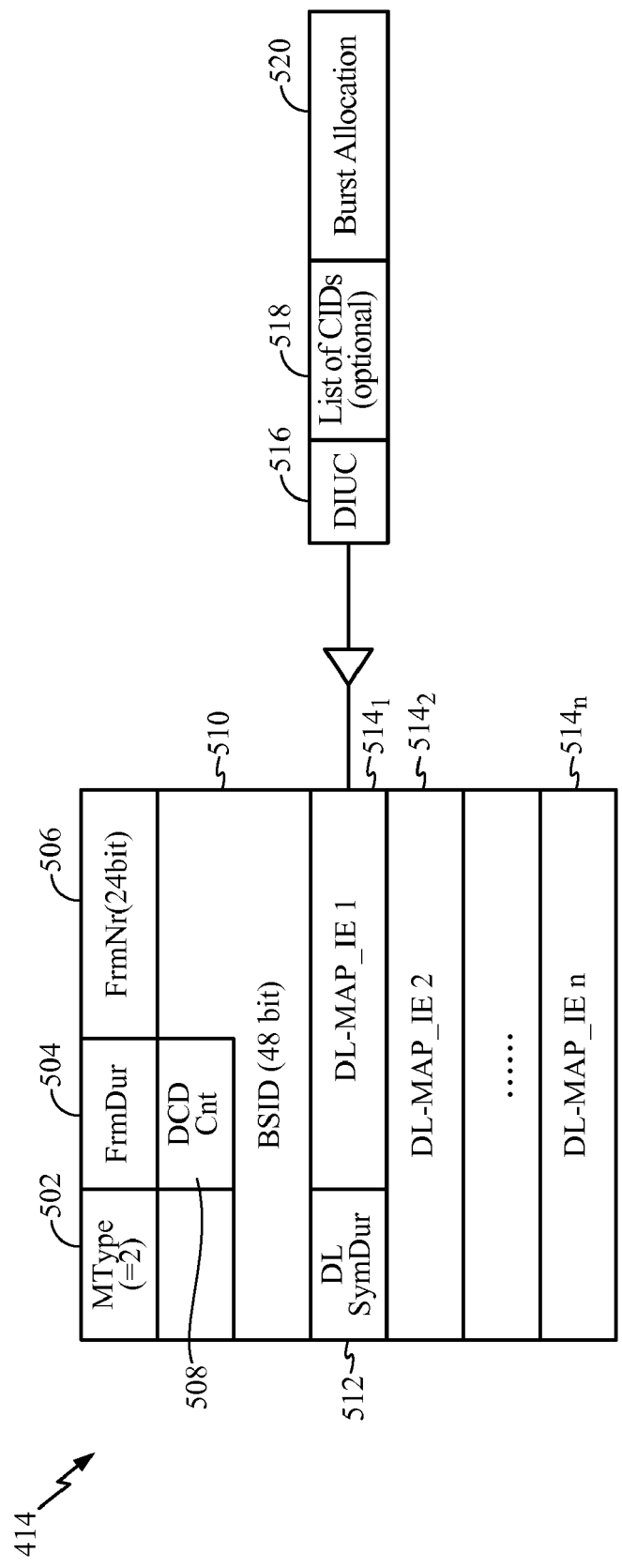

The DL-MAP 414 of FIG. 4A is illustrated in more detail in FIG. 5A with FIG. 5B illustrating the length in bits of each component of the DL-MAP 414. The DL-MAP 414 may begin with a Management Message Type 502 having a length of 8 bits, which has a value of 2 (00000010$_b$) to indicate the control message is a DL-MAP. The Management Message Type 502 may be followed by a frame duration code 504, which is 8 bits long, and a frame number 506, which is 24 bits long. The frame number 506 may be followed by a Downlink Channel Descriptor (DCD) count 508 having a length of 8 bits and matching the DCD configuration change count value. The DCD message refers to physical and Media Access Control (MAC) layer-related parameters to be applied to the downlink channel configuration of the sector. The DCD count 508 may be followed by a base station identifier (BSID) 510, having a length of 6 bytes for a total length of 48 bits. The BSID 510 may uniquely identify the base station in the network and may be followed by a DL symbol duration 512 indicating a number of OFDMA symbols in the DL subframe 402 and having a length of 8 bits. Altogether, the DL-MAP 414 up to this point has a length of 104 bits (8+8+24+8+48+8 bits).

A number (n) of DL-MAP information elements (IEs) 514 having variable lengths may follow the DL symbol duration 512. A generic DL-MAP IE 514 may comprise a Downlink Interval Usage Code (DIUC) 516, a list of connection IDs 518, and the DL burst allocation 520 (e.g., subchannel offset, symbol offset, subchannel number, and symbol number) to define a downlink transmission. A DIUC 516 between 0 and 12 inclusive may indicate that the DL-MAP IE provides a DL burst profile (i.e., the modulation and coding scheme used in the burst), while a DIUC 516 of 14 or 15 may indicate that the DL-MAP IE is a control information element. A DIUC 516 of 13 may indicate that the DL-MAP IE is used for safety zones (i.e., gap) and peak-to-average-power ratio (PAPR) reduction. Although not shown in FIG. 5A, some embodiments of the DL-MAP 414 may include padding having a length of 4 bits in an effort to reach a byte boundary for the DL-MAP 414.

Figure 6A:
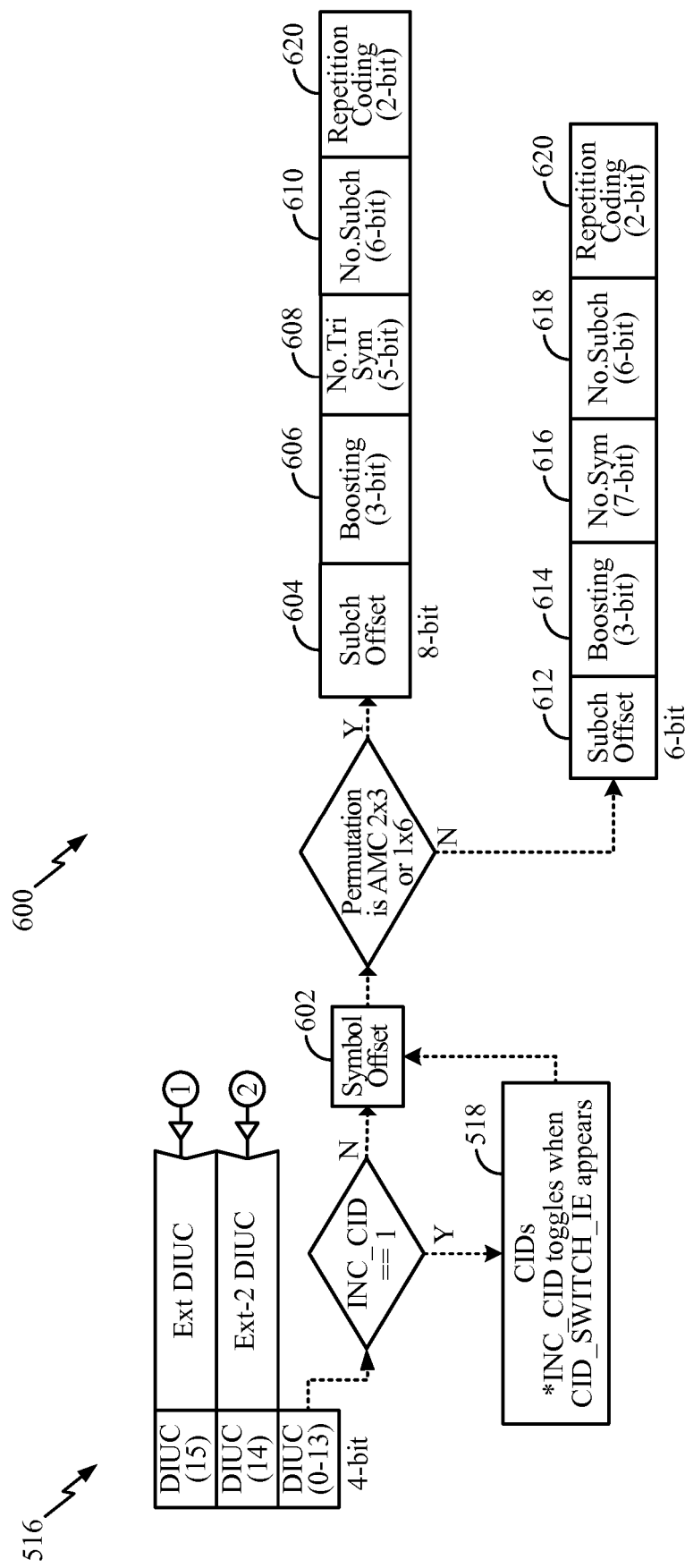
FIGS. 6A-C illustrate different types of DL-MAP IEs, in accordance with certain embodiments of the present disclosure.
Figure 6B:
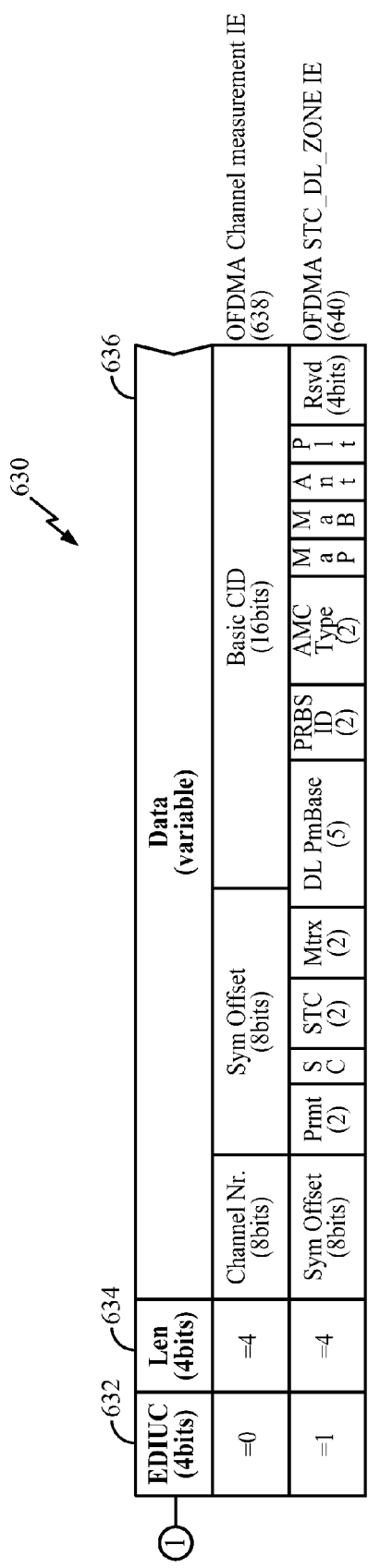
Figure 6C:
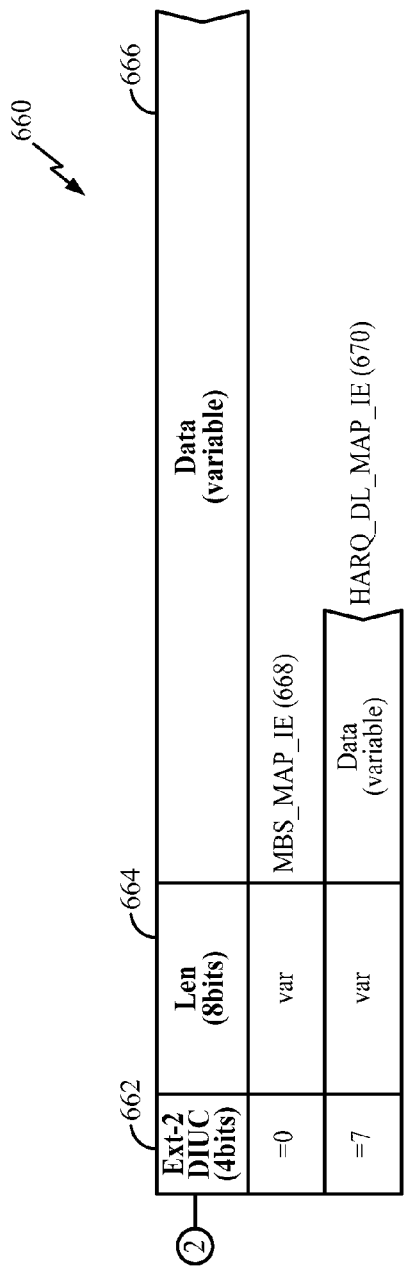
Figures 7A, 7B:
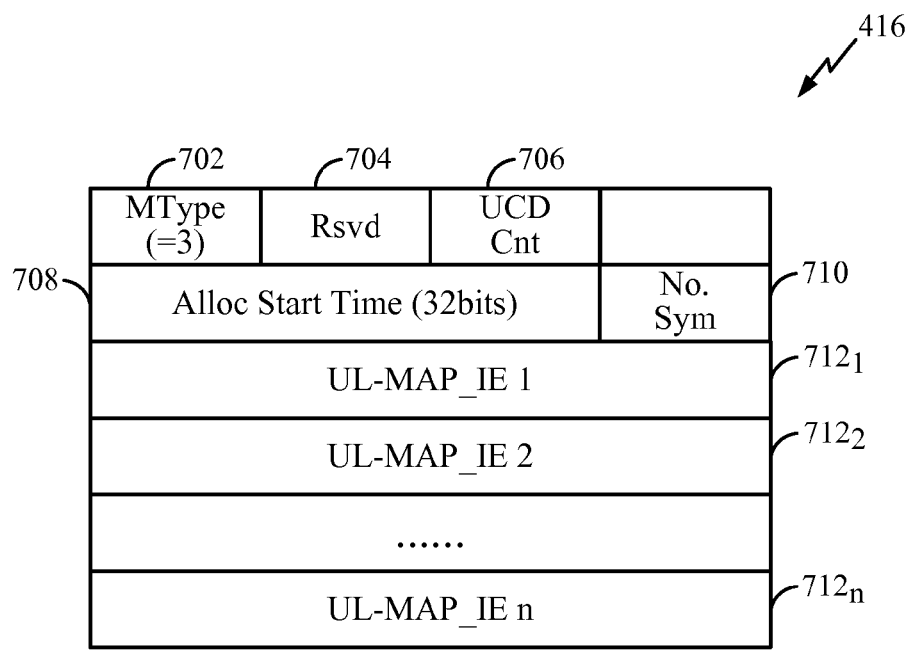
FIGS. 7A and 7B illustrate the format of and the bit size of entries in an uplink map (UL-MAP) message, in accordance with certain embodiments of the present disclosure.

Referring now to FIGS. 6A-6C, examples of different types of DL-MAP IEs 514 are illustrated in greater detail. FIG. 6A illustrates DL-MAP IEs having DIUC 516 values equal to 15, 14, or 0-13. When the DIUC 516 has a value between 0 and 13 inclusive, the DL-MAP IE 600 of FIG. 6A may include a list of connection identifiers (CIDs) 518 depending on whether INC_CID (include CID) was toggled to a value of 1 by CID_SWITCH_IE. If INC_CID is equal to 1, then the DL-MAP IE 600 may have a value indicating the number of CIDs (N_CID) having a length of 8 bits and a corresponding number of CIDs assigned for this IE, each having a length of 16 bits as illustrated in FIG. 7A. If INC_CID is equal to 0, then the DL-MAP IE 600 may have a length of zero bits for the list of CIDs 518. Following the optional list of CIDs 518, the DL-MAP IE 600 may be composed of an OFDMA symbol offset 602 having a length of 8 bits. Adaptive modulation and coding (AMC), also known as link adaptation, denotes matching of the modulation, coding, and other signal and protocol parameters to the conditions of the wireless channel (e.g. channel loss, receiver sensitivity, available transmitter power, and interference from other transmitters). Depending on the AMC scheme used, the DL-MAP IE 600 may have at least two different structures. If the AMC permutation is 2 bins by 3 symbols (2x3) or 1 bin by 6 symbols (1x6), then the DL-MAP IE 600 may be configured with the upper structure in FIG. 6A, with a subchannel offset 604 having a length of 8 bits, a boosting field 606 having a length of 3 bits, a number of OFDMA triple symbols field 608 having a length of 5 bits, and a number of subchannels field 610 having a length of 6 bits. Otherwise, the DL-MAP IE 600 may be configured with the lower structure in FIG. 6A, with a subchannel offset 612 having a length of 6 bits, a boosting field 614 having a length of 3 bits, a number of OFDMA symbols field 616 having a length of 7 bits, and a number of OFDMA subchannels field 618 having a length of 6 bits. The boosting fields 606, 614 may have various three-bit values indicating the boosting value, where $000_b$ indicates no boosting, $001_b$ indicates +6 dB boosting, $010_b$ indicates −6 dB boosting, $011_b$ indicates +9 dB boosting, $100_b$ indicates +3 dB boosting, $101_b$ indicates −3 dB boosting, $110_b$ indicates −9 dB boosting, and $111_b$ indicates −12 dB boosting.

The DL-MAP IE 600 may then include a repetition coding indication 620 having a length of 2 bits. The repetition coding indication 620 may have various two-bit values indicating the repetition coding, where $00_b$ indicates no repetition coding, $01_b$ indicates repetition coding of 2 used, $10_b$ indicates repetition coding of 4 used, and $11_b$ indicates repetition coding of 6 used. Therefore, a DL-MAP IE 600 without a list of CIDs 518 may have a length of 36 bits (4+8+22+2 bits), while a DL-MAP IE 600 with a list of CIDs 518 (INC_CID=1) may have a length of 44 bits+16 bits*N_CID.

FIG. 6B illustrates a DL-MAP Extended IE 630. After the DIUC 516 having a 4-bit value of 15 ($1111_b$), the DL-MAP Extended IE 630 may have an Extended DIUC 632 having a length of 4 bits as illustrated in FIG. 6B, a length field 634 having a length of 4 bits, and a data field 636 having various lengths according to the length field 634. Therefore, the DL-MAP Extended IE 630 may have a length of 12 bits (4+4+4 bits) plus the value in the length field 634, in units of bytes. If the extended DIUC 632 is equal to 0, then the DL-MAP Extended IE 630 may be for an OFDMA channel measurement IE 638 having a value of 4 bytes in the length field 634 and a corresponding length of 32 bits in the data field 636. If the Extended DIUC 632 is equal to 1, then the DL-MAP Extended IE 630 may be for an OFDMA STC_DL_ZONE IE 640 as illustrated, also having a value of 4 bytes in the length field 634 and a corresponding length of 32 bits in the data field 636.

FIG. 6C illustrates a DL-MAP Extended-2 IE 660. After the DIUC 516 having a 4-bit value of 14 ($1110_b$), the DL-MAP Extended-2 IE 660 may have an Extended-2 DIUC 662 having a length of 4 bits as illustrated in FIG. 6C, a length field 664 having a length of 8 bits, and a data field 666 having various lengths according to the length field 664. Therefore, the DL-MAP Extended-2 IE 660 may have a length of 16 bits (4+4+8 bits) plus the value in the length field 664, in units of bytes. If the Extended-2 DIUC 662 is equal to 0, then the DL-MAP Extended-2 IE 660 may be for an MBS_MAP_IE 668. If the Extended-2 DIUC 662 is equal to 7 ($0111_b$), then the DL-MAP Extended-2 IE 660 may be for a HARQ_DL_MAP_IE 670 as illustrated.

Exemplary UL-MAP and UL-MAP IEs

The UL-MAP 416 of FIG. 4A is illustrated in more detail in FIG. 7A with FIG. 7B illustrating the length in bits of each component of the UL-MAP 416. The UL-MAP 416 may begin with a Management Message Type 702 having a length of 8 bits, which has a value of 3 ($00000011_b$) to indicate the control message is a UL-MAP. The Management Message Type 702 may be followed by 8 bits in a reserved field 704. The reserved field 704 may be followed by an Uplink Channel Descriptor (UCD) count 706 having a length of 8 bits and matching the UCD configuration change count value. The UCD message refers to physical and Media Access Control (MAC) layer-related parameters to be applied to the uplink channel configuration of the sector. The UCD count 706 may be followed by an allocation start time 708 having a length of 32 bits and a number of symbols field 710 indicating a number of OFDMA symbols in the UL subframe 404 and having a length of 8 bits. Altogether, the UL-MAP 416 up to this point has a length of 64 bits (8+8+8+32+8 bits).

A number (n) of UL-MAP information elements (IEs) 712 having variable lengths may follow the number of symbols field 710. A generic UL-MAP IE 712 may comprise a connection identifier (CID) and an Uplink Interval Usage Code (UIUC) and may be used to define the uplink transmission. Although not shown in FIG. 7A, some embodiments of the UL-MAP 416 may include padding having a length of 4 bits in an effort to reach a byte boundary for the UL-MAP 416.

Figure 8:
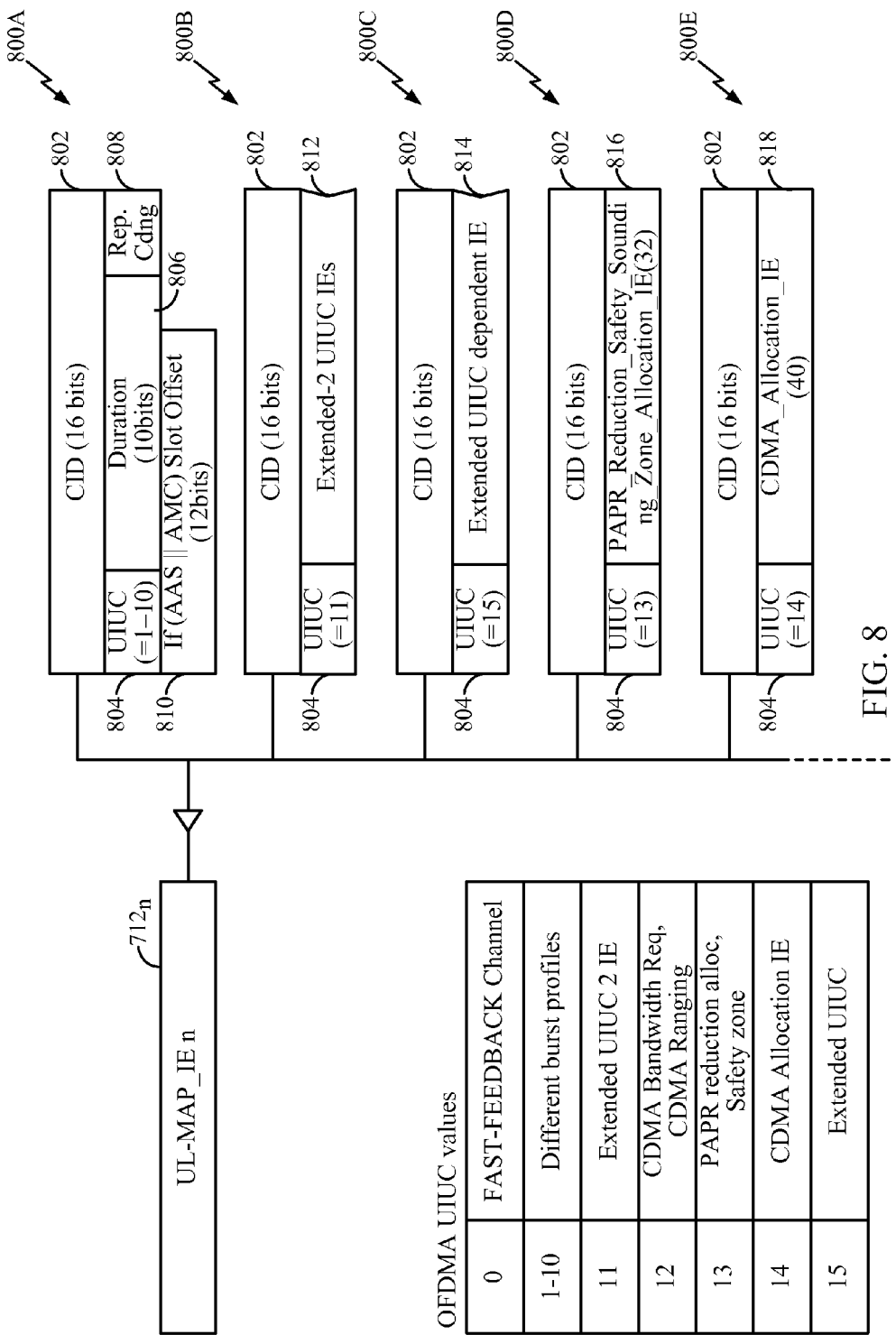
FIG. 8 illustrates different types of UL-MAP IEs and a table of OFDMA Uplink Interval Usage Code (UIUC) values, in accordance with certain embodiments of the present disclosure.

Referring now to FIG. 8, a UL-MAP IE 712 may comprise a CID 802 having a length of 16 bits. The CID 802 may be followed by a UIUC 804, which determines the usage for each CID 802 according to the table of OFDMA UIUC values in FIG. 8, for example. The UL-MAP IE 712 may have various lengths depending on the UIUC 804, which has a length of 4 bits.

In a UL-MAP IE 800A having a UIUC 804 between 1 and 10 inclusive, the UL burst profile (e.g., modulation and coding scheme) may be indicated. As illustrated in FIG. 8, the UIUC 804 may be followed by a duration 806 having a length of 10 bits. Having units of OFDMA slots, the duration 806 may be followed by a repetition coding indication 808 having a length of 2 bits. The repetition coding indication 808 may have various two-bit values indicating the repetition coding, where $00_b$ indicates no repetition coding, $01_b$ indicates repetition coding of 2 used, $10_b$ indicates repetition coding of 4 used, and $11_b$ indicates repetition coding of 6 used. For some UL-MAP IEs 800A, if Adaptive Antenna System (AAS) or AMC UL zone is used, then the repetition coding indication 808 may be followed by a slot offset 810 having a length of 12 bits. Therefore, a UL-MAP IE 800A without AAS or AMC UL zone used may have a length of 32 bits (16+4+10+2 bits), while a UL-MAP IE 800A with AAS or AMC UL zone used may have a length of 44 bits (16+4+10+2+12 bits).

A UL-MAP Extended-2 IE 800B may have a UIUC 804 equal to 11 as illustrated in FIG. 8. In a UL-MAP Extended-2 IE 800B, the UIUC 804 may be followed by Extended-2 information elements 812, which may include an Extended-2 UIUC having a length of 4 bits, a length field having a length of 8 bits, and a data field having a varying length according to the length field. Therefore, a UL-MAP Extended-2 IE 800B may have a length of 32 bits (16+4+4+8 bits) plus the value in the length field multiplied by 8.

A UL-MAP Extended IE 800C may have a UIUC 804 equal to 15 as illustrated in FIG. 8. In a UL-MAP Extended IE 800C, the UIUC 804 may be followed by Extended information elements 814, which may include an Extended UIUC having a length of 4 bits, a length field having a length of 4 bits, and a data field having a varying length according to the length field. Therefore, a UL-MAP Extended IE 800C may have a length of 28 bits (16+4+4+4 bits) plus the value in the length field multiplied by 8.

A UIUC 804 equal to 13 may indicate a UL-MAP IE 800D for PAPR reduction and safety zones as illustrated in FIG. 8. In such a UL-MAP IE 800D, the UIUC 804 may be followed by a PAPR_Reduction_Safety_Sounding_Zone_Allocation_IE 816 having a length of 32 bits. Therefore, a UL-MAP IE 800D with a UIUC=13 may have a length of 52 bits (16+4+32 bits). A UIUC 804 equal to 0 may indicate a UL-MAP IE for the fast feedback channel, which provides a UL zone for channel quality indication (CQI). Furthermore, a UIUC 804 equal to 12 may indicate a UL-MAP for code division multiple access (CDMA) ranging and bandwidth requests in a UL zone. Since the data following the UIUC 804 may also have a length of 32 bits in UL-MAP IEs with a UIUC=0 or 12, such UL-MAP IEs with a UIUC=0 or 12 may have a similar format to the UL-MAP IE 800D with a UIUC=13 and thus, may also have a length of 52 bits.

A UIUC 804 equal to 14 may indicate a UL-MAP IE 800E for CDMA allocation as illustrated in FIG. 8. In such a UL-MAP IE 800E, the UIUC 804 may be followed by a CDMA_Allocation_IE 818 having a length of 40 bits. Therefore, a UL-MAP IE 800E with a UIUC=14 may have a length of 60 bits (16+4+40 bits).

Exemplary Extensible Extended IE Mapping

IEs in the DL-MAP 414 and UL-MAP 416 may be decoded by a user terminal 106 directly without the user terminal knowing the modulation scheme, starting sub-channel, starting symbol, and other information that may typically be needed in order to decode the data bursts in the DL subframe 402. The data bursts may contain TLVs, standing for Type/Length/Value, which serve a similar purpose to IEs. In order to decode TLVs, a user terminal may typically receive and decode the Downlink Channel Descriptor (DCD) and Uplink Channel Descriptor (UCD) messages to obtain the starting sub-channel information, the length of the sub-channels, the starting symbol information, the length of the symbol information, and the modulation for the corresponding data burst, for example. As a result, decoding an attribute inside the DL-MAP or UL-MAP is much easier and more efficient than one in the data bursts.

New WiMAX IEs may be introduced through the extended IEs (DIUC 14 and 15 for the DL and UIUC 11 and 15 for the UL) to be broadcast in the DL-MAP 414 and UL-MAP 416, thereby avoiding the decoding dependency associated with data burst TLVs. According to the IEEE 802.16e standard and later published drafts, however, a number of extended IEs have already been defined using the extended DIUC and extended UIUC mapping schemes described above.

FIG. 9 illustrates the Extended DIUC assignments for the DL-MAP Extended IEs 630 when the DIUC=15 according to IEEE P802.16Rev2/D5-2008 section 8.3.6.2.2 and Table 323 (corresponding to IEEE 802.16e-2005 Table 277a). Currently, 12 out of 16 DL-MAP Extended IEs 630 are defined or used by the standard. Only Extended DIUC values 5, 6, 9, and 14 (0x5, 0x6, 0x9, and 0xE in hexadecimal, respectively) remain unassigned.

FIG. 10 illustrates the Extended-2 DIUC assignments for the DL-MAP Extended-2 IEs 660 when the DIUC=14 according to IEEE P802.16Rev2/D5-2008 section 8.4.5.3.2.2 and Table 325 (corresponding to IEEE 802.16e-2005 Table 277c). Currently, all 16 DL-MAP Extended-2 IEs 660 are defined or used by the standard, so no more Extended-2 IEs may be defined according to the standard.

FIG. 11 illustrates the Extended UIUC assignments for the UL-MAP Extended IEs 800C when the UIUC=15 according to IEEE P802.16Rev2/D5-2008 section 8.4.5.4.4 and Table 377 (corresponding to IEEE 802.16e-2005 Table 290a). Currently, 9 out of 16 UL-MAP Extended IEs 800C are defined or used by the standard. Only Extended UIUC values 1, 6, and 11-15 (0x, 0x6, and 0x B-0xF in hexadecimal, respectively) remain unassigned.

FIG. 12 illustrates the Extended-2 UIUC assignments for the UL-MAP Extended-2 IEs 800B when the UIUC=11 according to IEEE P802.16Rev2/D5-2008 section 8.4.5.4.4.2 and Table 379 (corresponding to IEEE 802.16e-2005 Table 290c). Currently, 15 out of 16 UL-MAP Extended-2 IEs 800B are defined or used by the standard. Only Extended-2 UIUC value 5 (0x5 in hexadecimal) remains unassigned.

One may notice that the number of unused values remaining in the current extended DIUC and extended UIUC mapping schemes is limited. Unfortunately, no Extended-2 DIUC values are available for DIUC=14, and only four Extended DIUC values are not used for DIUC=15. There are only one Extended-2 UIUC value available for UIUC=11 and five Extended UIUC values available for UIUC=15. As the WiMAX standard evolves, more and more new IEs are identified and considered for broadcasting through the DL-MAP 414 and UL-MAP 416. Since there are very limited values left in the current extended DIUC and UIUC mapping scheme, it is difficult to use the limited available spots to accommodate the future needs for IE broadcasting.

For this reason, new IEs are typically introduced through the data burst approach as TLVs. Compared with the IEs of the DL-MAP 414 and UL-MAP 416, it takes much longer to decode these data burst IEs, especially since a user terminal 106, such as an MS, cannot decode them unless the user terminal is able to receive and decode the DCD message. Otherwise, the user terminal has to wait for a successfully decoded DCD message. According to the IEEE 802.16 family of standards, the user terminal may have to wait up to 10 seconds in order to receive a DCD message. As a result, if a particular new IE is crucial to the user terminal, it may not be the best idea to relegate this new IE to a DL data burst.

Accordingly, there is a need for introducing an unlimited, or at least a high number of new IEs into the broadcast DL-MAP 414 and/or UL-MAP 416, rather than positioning these new IEs in data bursts of the DL subframe 402. Certain embodiments of the present disclosure are intended to enhance the WiMAX standards, such as IEEE 802.16e and IEEE 802.16Rev2 once approved, to allow an infinite number of IEs to be introduced in the DL-MAP and UL-MAP messages without any conflict with the existing IE definition. Presented below are a number of solutions for accomplishing this in an extensible way through both static and dynamic mapping schemes. In this manner, the broadcast IEs may be easily decoded by a user terminal without the dependency on DCD and/or UCD availability.

Figure 13:
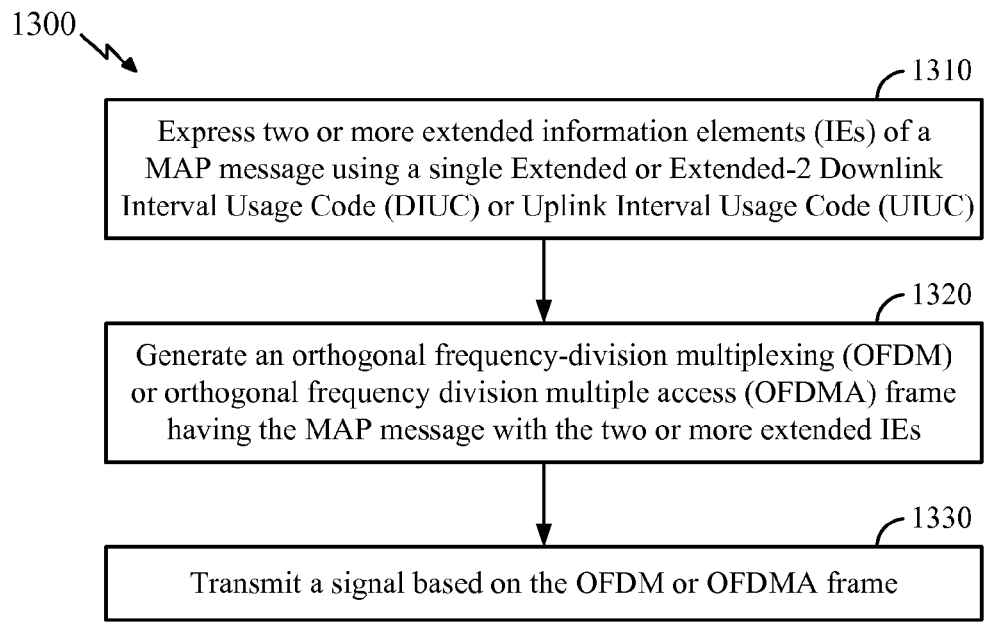
FIG. 13 is a flow chart of example operations for expressing an extensible extended IE in a MAP message of an OFDM or OFDMA frame, in accordance with certain embodiments of the present disclosure.

FIG. 13 is a flow chart of example operations 1300 for expressing an extensible extended IE in a MAP message of an OFDM or OFDMA frame from the perspective of a BS 104, in accordance with certain embodiments of the present disclosure. The operations 1300 may begin, at 1310, by expressing two or more extended IEs of a MAP message, such as the DL-MAP 414 or the UL-MAP 416, using a single Extended or Extended-2 DIUC or UIUC. For example, rather than expressing two DL-MAP Extended IEs 630 under two different Extended DIUC values, two or more DL-MAP Extended IEs may be expressed using only a single Extended DIUC 632. Various methods for such expression are described in greater detail below. Using these methods, an infinite number of extended IEs may theoretically be introduced to the IEEE 802.16 family of standards for WiMAX.

At 1320, the BS 104 may generate an OFDM or OFDMA frame 400 having the MAP message with the two or more extended IEs expressed using the single extended DIUC or UIUC code value. The BS 104 may transmit a signal based on the OFDM or OFDMA frame 400 at 1330. The transmitted signal may be intended for one or more user terminals 106.

Figure 14:
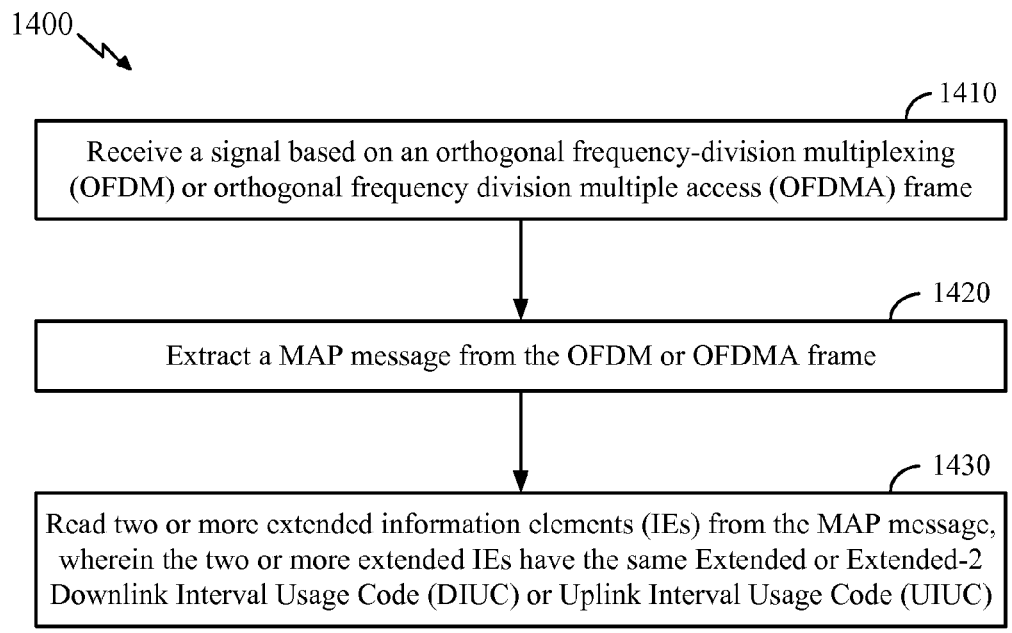
FIG. 14 is a flow chart of example operations for reading an extensible extended IE in a MAP message of an OFDM or OFDMA frame, in accordance with certain embodiments of the present disclosure.
Figure 14A:
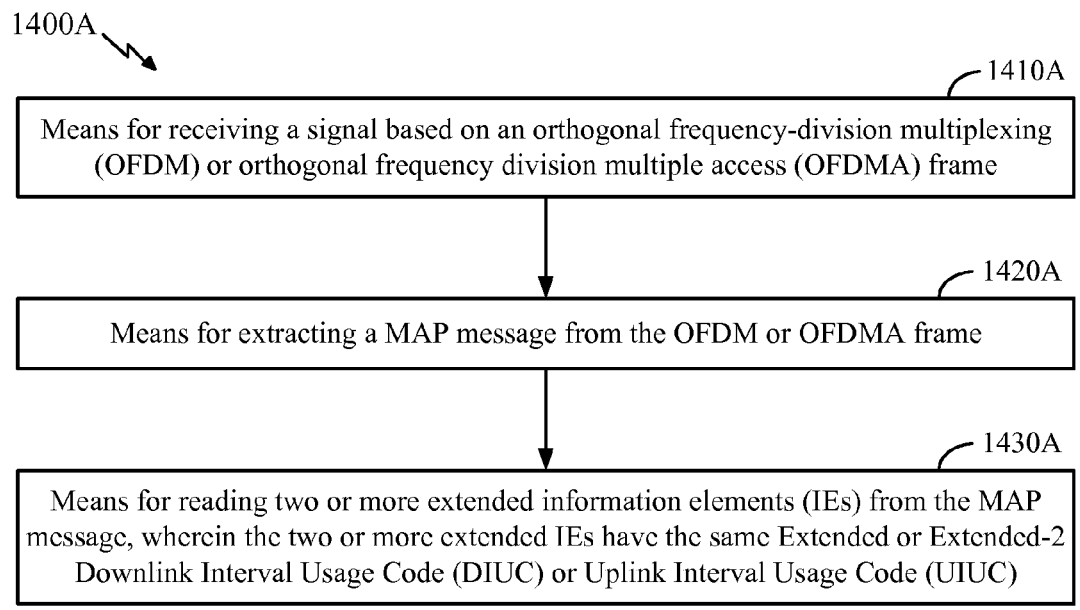
FIG. 14A is a block diagram of means corresponding to the example operations of FIG. 14 for reading an extensible extended IE, in accordance with certain embodiments of the present disclosure.

FIG. 14 is a flow chart of example operations for reading an extensible extended IE in a MAP message of an OFDM or OFDMA frame from the perspective of a user terminal 106, in accordance with certain embodiments of the present disclosure. The operations 1400 may begin, at 1410, by receiving a signal based on an OFDM or OFDMA frame 400. The user terminal may extract a MAP message from the OFDM or OFDMA frame 400 at 1420. At 1430, the MS may read two or more extended IEs from the MAP message, wherein the two or more extended IEs have the same Extended or Extended-2 DIUC or UIUC. For example, rather than reading two UL-MAP Extended-2 IEs 800B under two different Extended-2 UIUC values, two or more UL-MAP Extended IEs may be read under only a single Extended-2 UIUC 812.

Examplary Infinite Extensible Extended IE Mapping

As shown in FIG. 9 and IEEE P802.16Rev2/D5-2008 Table 323, Extended DIUC=5, 6, 9 and 14 (0x5, 0x6, 0x9, and 0xE in hexadecimal, respectively) are currently reserved. Assume any one of these four Extended DIUCs may be selected for the extensible extended IE mapping schemes below, despite the Extended DIUC actually illustrated in the Figures as being selected.

Also assume a desire to introduce 16 new extended IEs, which are not currently part of the IEEE 802.16e standard or the IEEE 802.16Rev2 standard once approved, into the DL-MAP 414. Since there are only 4 extended IE slots available, the current one-to-one mapping scheme used in the existing extended IE scheme cannot be used to share these 16 new extended IEs. In other words, under the existing standard, only 4 DL-MAP Extended IEs 630 can be created; the other 12 extended IEs may be expressed as TLVs in the DL data bursts.

Figure 15:
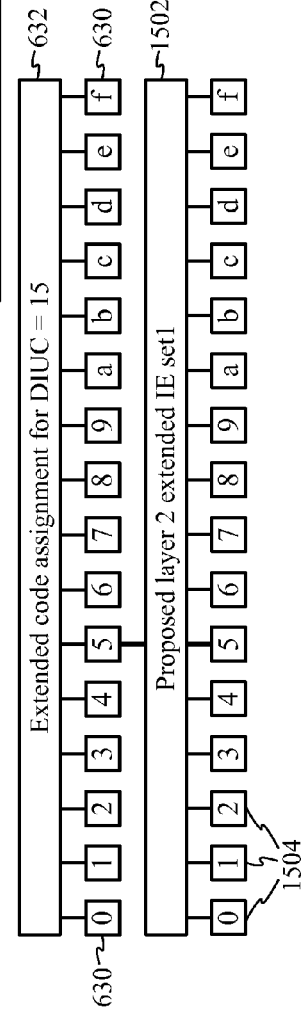
FIG. 15 illustrates an example extensible extended IE scheme using DIUC=15 and Extended DIUC=5 to introduce 16 new extended IEs inside the DL-MAP, in accordance with certain embodiments of the present disclosure.

In order to resolve this problem, one out of the four available DL extended IE slots may be selected, such as Extended DIUC=5, as a special tag to indicate that there are 16 new extended IEs. FIG. 15 illustrates the set 1502 of sixteen proposed layer 2 extended IEs 1504 associated with Extended DIUC=5 according to certain embodiments of the extensible extended IE scheme. In order to differentiate these 16 new extended IEs, we can use the 4 bits in the original length field 634 as the index for these 16 proposed layer 2 extended IEs 1504. For example, DIUC=15, Extended DIUC=5, and a length field 634 equal to 10 (0xA in hexadecimal) maybe used to specify proposed layer 2 extended IE(A) in the proposed layer 2 extended IE set 1502. The first 4 bits of the original unspecified data field 636 for Extended DIUC=5 may function as a new length field to specify the variable length of data. In this manner, up to sixteen extended IEs may be expressed using a single Extended DIUC 632.

Of course, the other three DL extended IE slots may be employed similarly for a total of 64 (=16*4) new extended IEs. If this is done, however, there will be no more available DL extended IE slots, and the number of new extended IEs will be limited. No further new DL extended IEs may be introduced.

Figure 15A:
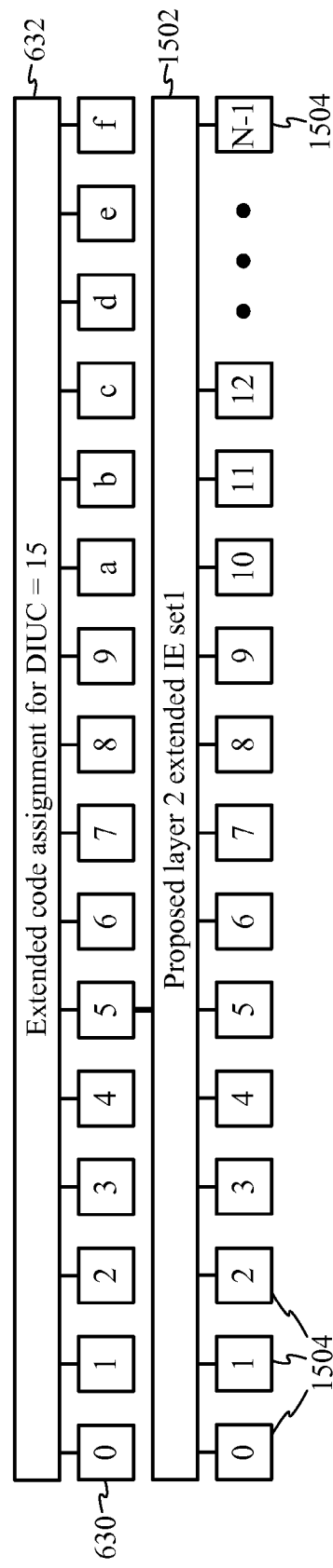
FIG. 15A illustrates an example infinite extensible extended IE scheme using DIUC=15 and Extended DIUC=5 to introduce N new IEs with index length=n inside the DL-MAP, where $2^{(n-1)} < N \leq 2^n$, in accordance with certain embodiments of the present disclosure.

Therefore, if there is a desire to introduce N new extended IEs 1504 and $2^{(n-1)} < N \leq 2^n$, then for some embodiments, the first n bits after the 4-bit Extended DIUC 632 may be utilized as the index for a set 1502 of N proposed layer 2 extended IEs 1504, as shown in FIG. 15A where the Extended DIUC=5. For example, if 45 new extended IEs 1504 were desired, then 6 bits may be used to reference proposed layer 2 extended IE(0) to IE(44). Up to a total of 64 possible new extended IEs 1504 may be referenced with 6 bits.

Figure 15B:
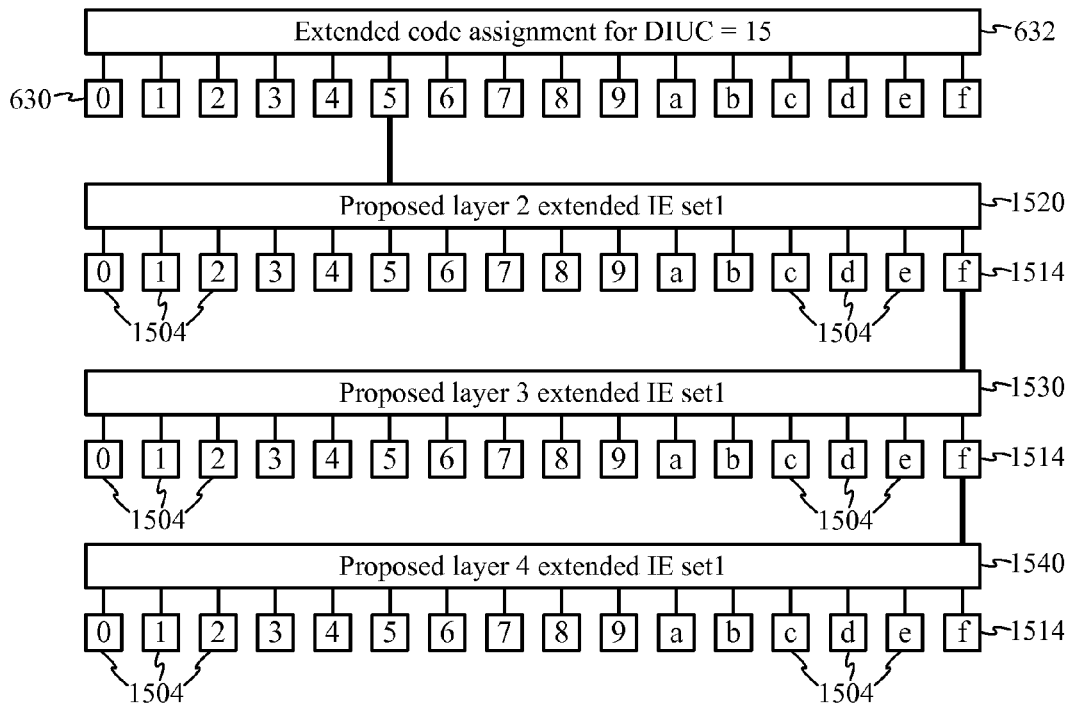
FIG. 15B illustrates an example infinite extensible extended IE scheme using DIUC=15 and Extended DIUC=5 to introduce 45 new IEs with index length=4 inside the DL-MAP, in accordance with certain embodiments of the present disclosure.

For other embodiments, an approach with a fixed or constant index length may be used instead of n bits for mapping to these N new extended IEs 1504. This approach is depicted in the example of FIG. 15B, where the index length (n) is 4 bits, the same as the original length field 634. With an index length of 4 bits, only sixteen new IEs may be referenced, as described above with respect to FIG. 15. Therefore, the constant index length approach employs additional mapping layers to introduce N new extended IEs 1504. To reference each additional mapping layer, one of the potential new IEs referenced by a certain index value in each layer is sacrificed such that this index value may indicate the existence of another layer. Therefore, rather than 16 new IEs on each layer with n=4, only 15 new IEs may be referenced on each layer. The number of layers (l) is chosen such that $N \leq l(2^n - 1)$.

As shown in FIG. 15B, N=45 new extensible IEs 1504 are mapped using three layers (l=3), and more new IEs may still be appended. An index value of 15 (0xF in hexadecimal) is used to indicate a new extensible extended IE layer, such that 0xF represents the sacrificed new IE 1514. In this manner, when a user terminal decoding the DL-MAP has read the Extended DIUC 632, it will read the first 4 bits of the index. If these bits do not equal 15 (0xF), then the user terminal may reference the new extended IEs in the proposed layer 2 extended IE set 1520 according to these 4 bits. On the other hand, if the first 4 bits of the index equal 15 (0xF), then the user terminal may read the next 4 bits of the index. If the second set of 4 bits does not equal 15 (0xF), then the user terminal may reference the new extended IEs in the proposed layer 3 extended IE set 1530 according to these 4 bits. But if the second set of 4 bits of the index equals 15 (0xF), then the user terminal may read the next 4 bits of the index. This third set of 4 bits of the index may reference the new extended IEs in the proposed layer 4 extended IE set 1540.

Note that there are other possible and similar ways to share N new extended IEs 1504, such as using combinations or modifications of the above approaches.

Exemplary Infinite Extensible Extended IE under Different Extended IE Category

Figure 16:
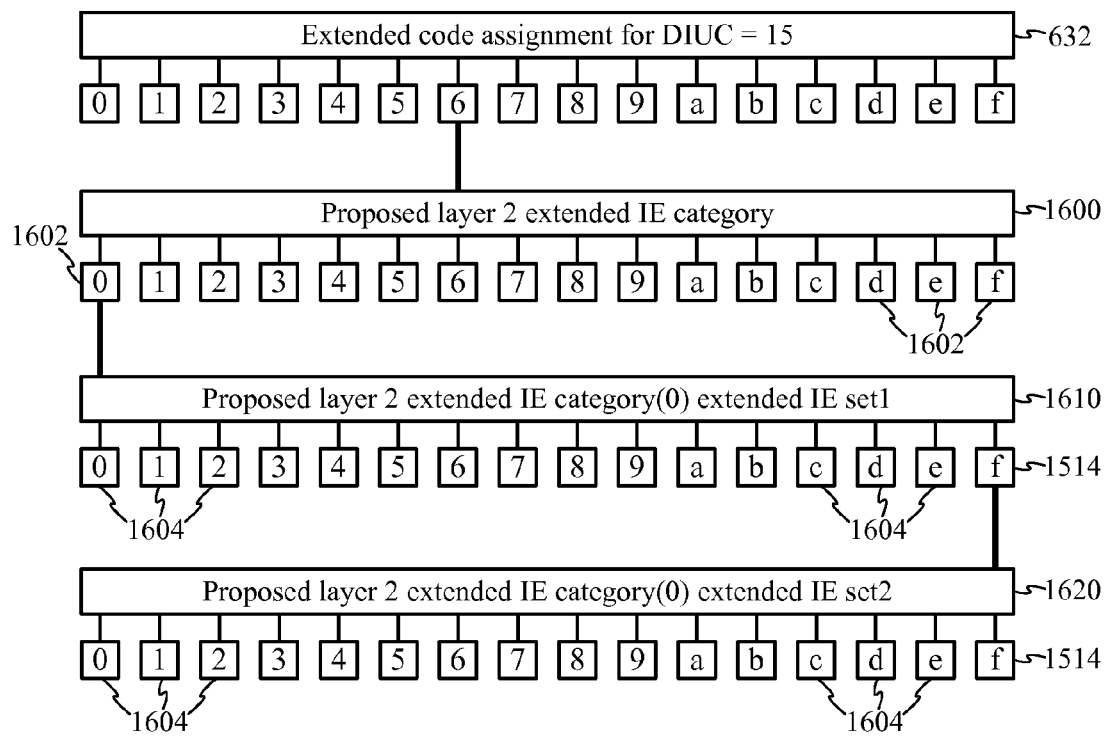
FIG. 16 illustrates an example extensible extended IE scheme using DIUC=15 and Extended DIUC=6 to introduce 16 new categories of extended IEs, in accordance with certain embodiments of the present disclosure.

Each extended IE is used to serve a special function or provide a feature. For example, some of the extended IEs are intended for ranging, while other IEs are meant for paging. Instead of using the jumbled approach described above where functionally-related extended IEs may be scattered, a category approach could be implemented to group the related new extended IEs. For example, assume 16 new extended IEs categories may be proposed, such as category 0 for ranging, category 1 for paging, category 2 for traffic, etc., and multiple new extended IEs 1604 may be included under each category as shown in FIG. 16. Although any available Extended DIUC value may be selected to indicate the category approach, Extended DIUC=6 in FIG. 16 as an example.

In order to serve M new extended IE categories and $2^{(m-1)} < M \leq 2^m$, the original length field 634 may be changed from 4 to m bits in size. In this manner, a set 1600 of M proposed layer 2 extended IE categories 1602 may be referenced. The multiple new extended IEs 1504 under each category may be indexed using any one or combination of the possible methods described above with respect to FIGS. 15, 15A, and 15B. In FIG. 16 as an example, the constant index length approach with n=4 has been selected to introduce N=30 new extended IEs 1504 in category (0) using two layers (l=2): proposed layer 2 extended IE category (0) extended IE set 1 1610 and proposed layer 2 extended IE category (0) extended IE set 2 1620, both with fifteen new extended IEs 1604.

Examplary Combination Infinite Extensible Extended IE Mapping

Figure 17:
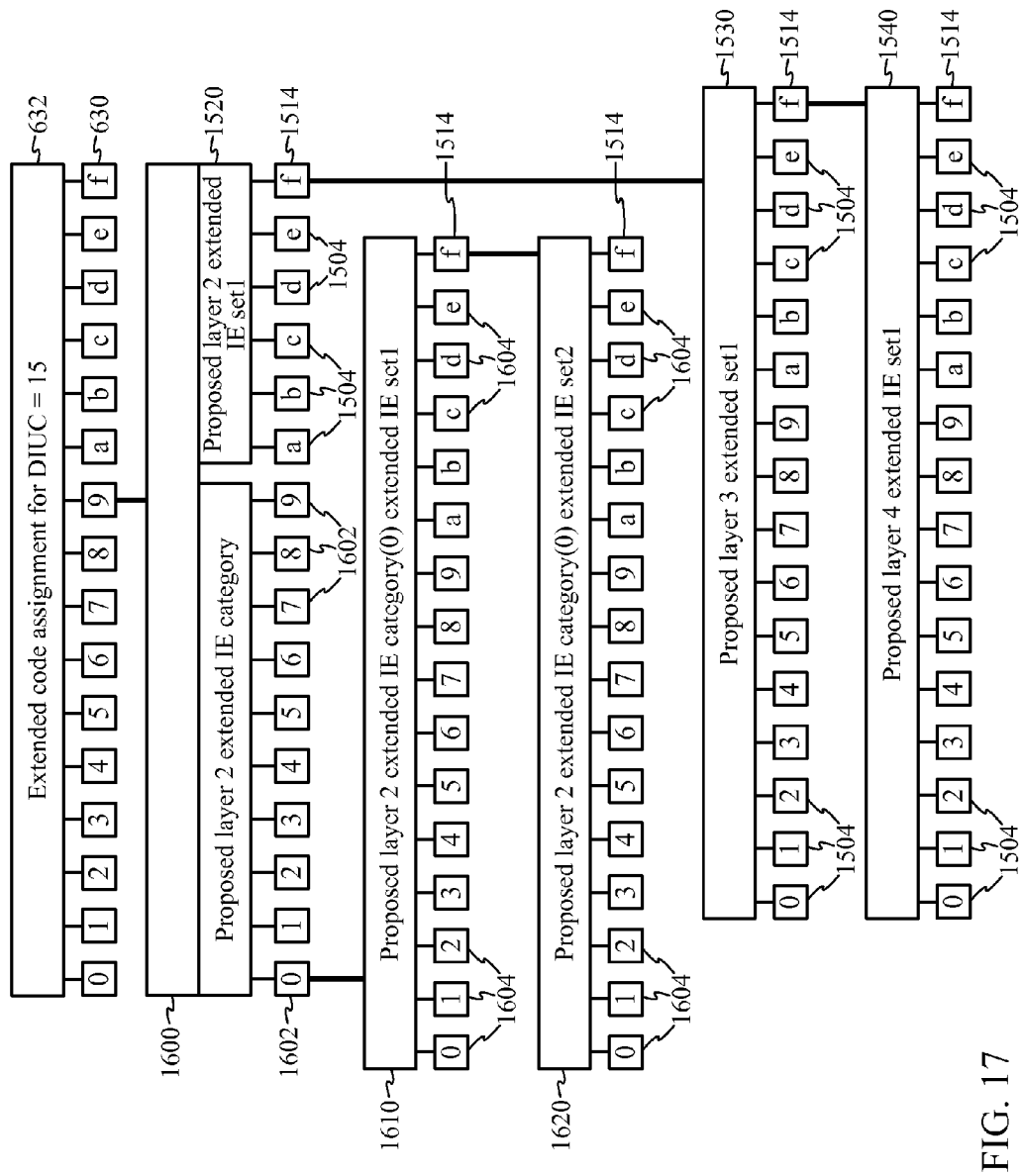
FIG. 17 illustrates an example combination extensible extended IE scheme using DIUC=15 and Extended DIUC=9 to introduce 10 new extended IE categories and 35 new IEs without the category relationship inside the DL-MAP, in accordance with certain embodiments of the present disclosure.

FIG. 17 illustrates a combination approach, combining the scattered approach with the category approach. This combination approach may allow new extended IEs 1504 not belonging to an IE category to share the same layer with those categories 1602 expressed in the extended IE category scheme.

Assume only M categories may be identified according to the IEEE 802.16 standards, where $M<2^m$. In that case, some of the $2^m$ slots will not be used by the category assignment. In order to make use of these unused slots ($2^m$-M), these slots may be reserved for further category assignment, used for new extended IEs not belonging to any category as shown in FIG. 17, or for other purposes.

FIG. 17 illustrates an example combination extensible extended IE scheme using DIUC=15 and Extended DIUC=9 to introduce 10 new extended IE categories 1602 and 35 (=5+15*2) new IEs unrelated to category relationship inside the DL-MAP. In this case, M=10, m=4, $2^m$-M-1=5, l=2, and n=4. Here, a new extended IE "category" of 15 (0xF in hexadecimal) indicates another layer of new extended IEs 1504 beyond the proposed layer 2 extended IE set 1520.

Of course, one of the categories 1602 may be new extended IEs not belonging to any of the other categories. In this case, new extended IE category 10 (0xA) could be used to reference the 35 new extended IEs 1504 shown.

Exemplary Infinite Extensible Extended IE Dynamic Mapping

The extensible extended IE schemes proposed above use a static mapping approach to map new extended IEs. For some embodiments, a dynamic mapping approach to map new extended IEs through a single reserved Extended DIUC slot may be employed. In a dynamic mapping approach, the mapping scheme of each new extended IE may be different.

FIG. 18 illustrates one such extensible extended IE dynamic mapping scheme, which may save memory when the number N of new extended IEs is very large. For example, suppose 65,536 new extended IEs are desired, which may be represented by n=16 bits, similar to a much larger version of the embodiment illustrated in FIG. 15A. Although any unassigned Extended DIUC value may be selected to indicate this dynamic mapping approach, FIG. 18 illustrates using the Extended DIUC=14 (0xE in hexadecimal) as an example.

The first n=16 bits after the Extended DIUC 632 (i.e., the Extended IE ID 1806) may be reserved in an effort to indicate which new extended IE 1804 is being indexed out of the proposed layer 2 extended IE set 1820. Since the schema of each new extended IE may be different, the following three new attributes may be used to specify the size of unspecified data for this extended IE in an effort to most efficiently use the memory size: size unit field 1808, size of length field 1810, and size of unspecified data in size unit field 1812.

The size unit field 1808 may provide an option to specify the unspecified data size in different units: bits, nibbles, bytes, or words. If the size unit field 1808 is represented by two bits, then "0" may represent bits, "1" may represent nibbles, "2" may represent bytes, and "3" may represent words. The value in the size of length field 1810 may be the exponent for a base of 2 to determine the maximal size unit of the unspecified data. For some embodiments, the size of length field 1810 may be represented by four bits. The size of unspecified data in size unit field 1812 may specify the length of the unspecified data in divisions according to the maximal size unit calculated from $2^{size\ of\ length}$. The size of unspecified data in size unit field 1812 may be viewed as analogous to the original length field 634 of the DL-MAP Extended IE 630.

For example, a new extended IE, Ranging Traffic IE, may be introduced to specify the ranging traffic for the serving cell. Since the information is well-defined in a 1-byte format, the size unit field 1808 may be set to 2 for bytes, and the size of length field 1810 may be set to 1. Another new extended IE, Frames between the Current Frame and the Coming DCD Message, may be introduced to specify how many frames are between the current frame and the coming DCD message. Since the maximal time interval between any 2 consecutive DCD messages is 10 seconds, the size unit field 1808 may be set to 0, and the size of length field 1810 may be set to 14, so the size of unspecified data in size unit field 1812 can range up to 16 seconds ($2^{14}$>16,000). The UCD has the same time out value as the DCD, so the settings used in Frames between the Current Frame and the Coming UCD Message may be the same as for the previous new IE example. Yet another new extended IE, Frames between the Current Frame and the Coming Neighbor Advertisement (MOB_NBR-ADV) Message, may be introduced to specify how many frames are between the current frame and the coming MOB_NBR-ADV message. Since the maximal time interval between any 2 consecutive MOB_NBR-ADV messages is 30 seconds, the setting of this new extended IE may be similar to that for the DCD message, except that the size of length field 1810 may be set to 15 instead of 14.

A constant index length approach, similar to that discussed with respect to FIG. 15B, to carry an infinite number of extended IEs in the same DL/UL-MAP message may also be considered. The only difference between this constant index length dynamic approach and the constant index length approach of FIG. 15B is that each slot used in the latter may always be reserved by a given extended IE, while each slot used in the former may be shared by all of the extended IEs. However, this constant index length dynamic approach may be less useful, because each DL/UL-MAP message itself can contain multiple DL/UL-MAP_IEs, and each DL-MAP_IE can use the basic dynamic approach scheme introduced with FIG. 18.

Figure 18A:
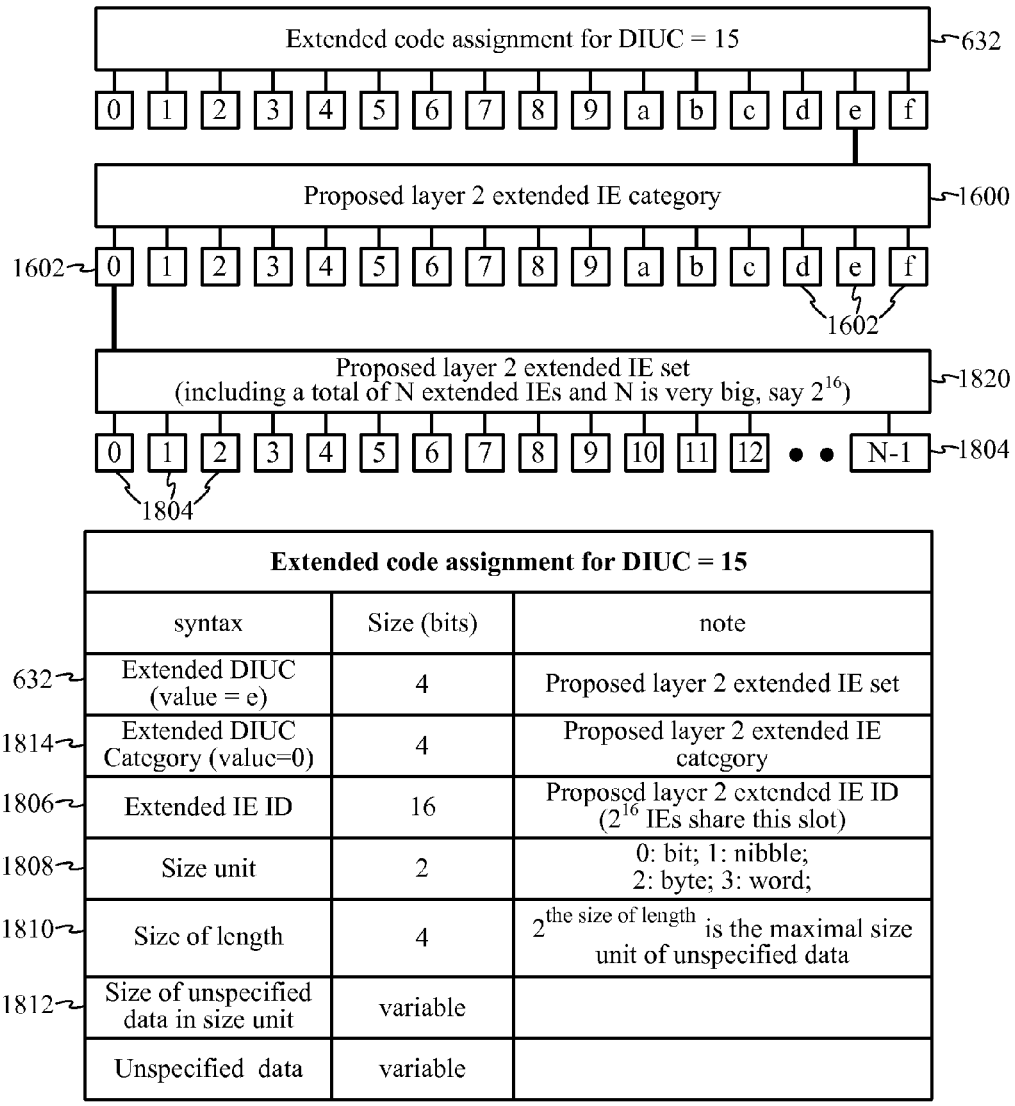
FIG. 18A illustrates an example extensible extended IE dynamic mapping scheme using DIUC=15 and Extended DIUC=14 (0xE in hexadecimal) to introduce 16 extended IE categories, wherein each category introduces 65,536 new extended IEs and the size of length and the size of unspecified data are variable among the extended IEs, in accordance with certain embodiments of the present disclosure.

Exemplary Infinite Extensible Extended ID Dynamic Mapping Under Different Extended IE Category Furthermore, the category concept of FIG. 16 may be added to the dynamic mapping approach of FIG. 18. This extensible extended IE dynamic mapping scheme is illustrated in FIG. 18A. An Extended DIUC category field 1814 may be added to the attributes of the dynamic mapping approach to select the categories 1602 for referencing the new extended IEs 1804. For some embodiments, the Extended DIUC category field 1814 may have a size of 4 bits for 16 possible categories 1602. In this manner, each category may have an infinite number of new, dynamically-mapped extended IEs.

Figure 13A:
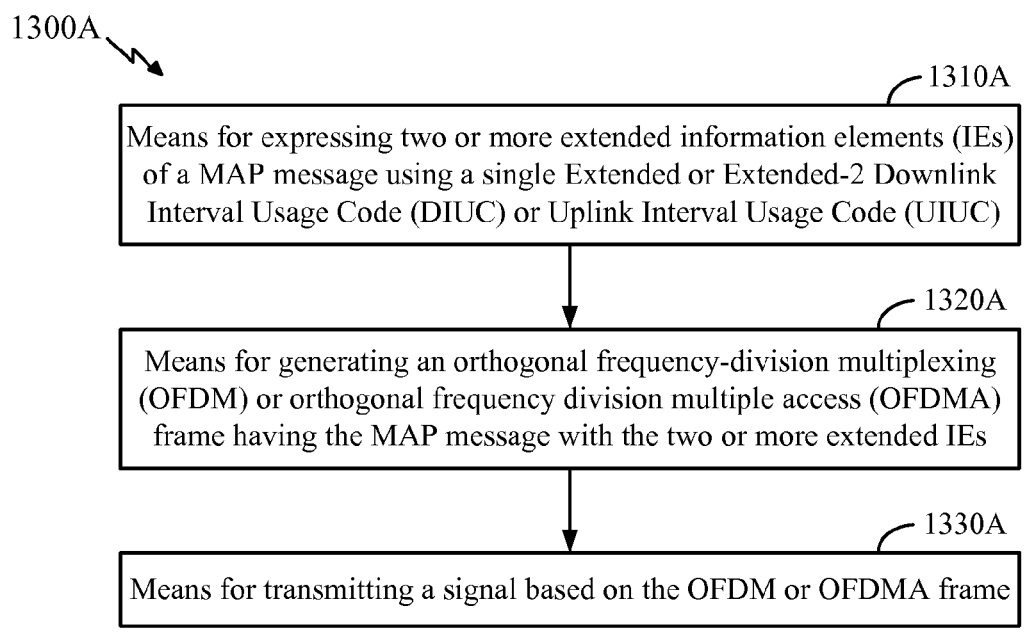
FIG. 13A is a block diagram of means corresponding to the example operations of FIG. 13 for expressing an extensible extended IE, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 1310-1330 illustrated in FIG. 13 correspond to means-plus-function blocks 1310A-1330A illustrated in FIG. 13A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for conveying control messages in wireless communications, comprising:
    expressing two or more extended information elements (IEs) of a MAP message using, in part, a single Extended or Extended-2 Downlink Interval Usage Code (DIUC) or a single Extended or Extended-2 Uplink Interval Usage Code (UIUC);
    setting one or more bits, within the information element (IE), to select at least one of the expressed two or more extended IEs;
    generating an orthogonal frequency-division multiplexing (OFDM) or orthogonal frequency division multiple access (OFDMA) frame having the MAP message with the two or more extended IEs; and
    transmitting a signal based on the OFDM or OFDMA frame.

2. The method of claim 1, wherein the two or more extended IEs are expressed using a single unused Extended or Extended-2 DIUC or a single unused Extended or Extended-2 UIUC according to one or more standards of the Institute of Electrical and Electronics Engineers (IEEE) 802.16 family of standards.

3. The method of claim 1, wherein the MAP message comprises an uplink (UL) MAP message and the two or more extended IEs are expressed using a single Extended UIUC having a value of 0x1, 0x6, 0xB, 0xC, 0xD, 0xE, or 0xF in hexadecimal.

4. The method of claim 1, wherein the MAP message comprises an uplink (UL) MAP message and the two or more extended IEs are expressed using a single Extended-2 UIUC having a value of 0x5 in hexadecimal.

5. The method of claim 1, wherein the MAP message comprises a downlink (DL) MAP message and the two or more extended IEs are expressed using a single Extended DIUC having a value of 0x5, 0x6, 0x9, or 0xE in hexadecimal.

6. The method of claim 1, wherein expressing the two or more extended IEs comprises using n bits after the Extended or Extended-2 DIUC or after the Extended or Extended-2 UIUC as an index for indicating which of the two or more extended IEs is being expressed in a single extended IE for up to N extended IEs, where $2^{(n-1)} \leq N < 2^n$.

7. The method of claim 6, wherein N=16 and n=4.

8. The method of claim 6, further comprising specifying a length in bytes of data in the single extended IE currently being expressed using 4 bits after the n bits.

9. The method of claim 6, further comprising:
specifying a data size unit after the n bits; and
specifying a size of length after the data size unit, wherein 2 raised to the power of the size of length is the maximum size of unspecified data, such that the two or more extended IEs are dynamically mapped in the MAP message.

10. The method of claim 1, wherein expressing the two or more extended IEs comprises using m bits after the Extended or Extended-2 DIUC or after the Extended or Extended-2 UIUC as a category index for indicating to which category a single extended IE, out of the two or more extended IEs, being expressed belongs for up to M categories, where $2^{(m-1)} \leq M < 2$ μm.

11. The method of claim 10, further comprising using n bits after the category index as an IE index for indicating which of the two or more extended IEs is being expressed in the single extended IE in the category for up to N extended IEs, where $2^{(n-1)} \leq N < 2^n$.

12. The method of claim 10, further comprising designating 2m−M slots for extended IEs that do not belong to the category, wherein the category index indicates which of the two or more extended IEs is being expressed in the single extended IE.

13. The method of claim 10, further comprising specifying a length in bytes of data in the single extended IE currently being expressed using 4 bits after the m bits.

14. The method of claim 10, further comprising:
specifying a data size unit after the m bits; and
specifying a size of length after the data size unit, wherein 2 raised to the power of the size of length is the maximum size of unspecified data, such that the two or more extended IEs are dynamically mapped in the MAP message.

15. An apparatus for conveying control messages in wireless communications, comprising:
means for expressing two or more extended information elements (IEs) of a MAP message using, in part, a single Extended or Extended-2 Downlink Interval Usage Code (DIUC) or a single Extended or Extended-2 Uplink Interval Usage Code (UIUC);
means for setting one or more bits to select at least one of the expressed two or more extended IEs;
means for generating an orthogonal frequency-division multiplexing (OFDM) or orthogonal frequency division multiple access (OFDMA) frame having the MAP message with the two or more extended IEs; and
means for transmitting a signal based on the OFDM or OFDMA frame.

16. The apparatus of claim 15, wherein the two or more extended IEs are expressed using a single unused Extended or Extended-2 DIUC or a single unused Extended or Extended-2 UIUC according to one or more standards of the Institute of Electrical and Electronics Engineers (IEEE) 802.16 family of standards.

17. The apparatus of claim 15, wherein the MAP message comprises an uplink (UL) MAP message and the two or more extended IEs are expressed using a single Extended UIUC having a value of 0x1, 0x6, 0xB, 0xC, 0xD, 0xE, or 0xF in hexadecimal.

18. The apparatus of claim 15, wherein the MAP message comprises an uplink (UL) MAP message and the two or more extended IEs are expressed using a single Extended-2 UIUC having a value of 0x5 in hexadecimal.

19. The apparatus of claim 15, wherein the MAP message comprises a downlink (DL) MAP message and the two or more extended IEs are expressed using a single Extended DIUC having a value of 0x5, 0x6, 0x9, or 0xE in hexadecimal.

20. The apparatus of claim 15, wherein the two or more extended IEs are expressed using n bits after the Extended or Extended-2 DIUC or after the Extended or Extended-2 UIUC as an index for indicating which of the two or more extended IEs is being expressed in a single extended IE for up to N extended IEs, where $2^{(n-1)} \leq N < 2^n$.

21. The apparatus of claim 20, wherein N=16 and n=4.

22. The apparatus of claim 20, further comprising means for specifying a length in bytes of data in the single extended IE currently being expressed using 4 bits after the n bits.

23. The apparatus of claim 20, further comprising:
means for specifying a data size unit after the n bits; and
means for specifying a size of length after the data size unit, wherein 2 raised to the power of the size of length is the maximum size of unspecified data, such that the two or more extended IEs are dynamically mapped in the MAP message.

24. The apparatus of claim 15, wherein the two or more extended IEs are expressed using m bits after the Extended or Extended-2 DIUC or after the Extended or Extended-2 UIUC as a category index for indicating to which category a single extended IE, out of the two or more extended IEs, being expressed belongs for up to M categories, where $2^{(m-1)} \leq M < 2$ μm.

25. The apparatus of claim 24, further comprising means for using n bits after the category index as an IE index for indicating which of the two or more extended IEs is being expressed in the single extended IE in the category for up to N extended IEs, where $2^{(n-1)} \leq N < 2^n$.

26. The apparatus of claim 24, further comprising means for designating 2m−M slots for extended IEs that do not belong to the category, wherein the category index indicates which of the two or more extended IEs is being expressed in the single extended IE.

27. The apparatus of claim 24, further comprising means for specifying a length in bytes of data in the single extended IE currently being expressed using 4 bits after the m bits.

28. The apparatus of claim 24, further comprising:
means for specifying a data size unit after the m bits; and
means for specifying a size of length after the data size unit, wherein 2 raised to the power of the size of length is the maximum size of unspecified data, such that the two or more extended IEs are dynamically mapped in the MAP message.

29. An apparatus for conveying control messages in wireless communications, comprising:
a processor;
memory in electronic communication with the processor; and instructions stored in the memory, the instructions being executable by the processor to:

express two or more extended information elements (IEs) of a MAP message using, in part, a single Extended or Extended-2 Downlink Interval Usage Code (DIUC) or a single Extended or Extended-2 Uplink Interval Usage Code (UIUC);

set one or more bits, within the information element (IE), to select at least one of the expressed two or more extended IEs;

generate an orthogonal frequency-division multiplexing (OFDM) or orthogonal frequency division multiple access (OFDMA) frame having the MAP message with the two or more extended IEs; and transmit a signal based on the OFDM or OFDMA frame.

30. The apparatus of claim 29, wherein the two or more extended IEs are expressed using a single unused Extended or Extended-2 DIUC or a single unused Extended or Extended-2 UIUC according to one or more standards of the Institute of Electrical and Electronics Engineers (IEEE) 802.16 family of standards.

31. The apparatus of claim 29, wherein the MAP message comprises an uplink (UL) MAP message and the two or more extended IEs are expressed using a single Extended UIUC having a value of 0x1, 0x6, 0xB, 0xC, 0xD, 0xE, or 0xF in hexadecimal.

32. The apparatus of claim 29, wherein the MAP message comprises an uplink (UL) MAP message and the two or more extended IEs are expressed using a single Extended-2 UIUC having a value of 0x5 in hexadecimal.

33. The apparatus of claim 29, wherein the MAP message comprises a downlink (DL) MAP message and the two or more extended IEs are expressed using a single Extended DIUC having a value of 0x5, 0x6, 0x9, or 0xE in hexadecimal.

34. The apparatus of claim 29, wherein the instructions are executable by the processor to use n bits after the Extended or Extended-2 DIUC or after the Extended or Extended-2 UIUC as an index for indicating which of the two or more extended IEs is being expressed in a single extended IE for up to N extended IEs, where $2^{(n-1)} \leq N < 2^n$.

35. The apparatus of claim 34, wherein N=16 and n=4.

36. The apparatus of claim 34, wherein the instructions are executable by the processor to specify a length in bytes of data in the single extended IE currently being expressed using 4 bits after the n bits.

37. The apparatus of claim 34, wherein the instructions are executable the processor to:
specify a data size unit after the n bits; and
specify a size of length after the data size unit, wherein 2 raised to the power of the size of length is the maximum size of unspecified data, such that the two or more extended IEs are dynamically mapped in the MAP message.

38. The apparatus of claim 29, wherein the instructions are executable by the processor to use m bits after the Extended or Extended-2 DIUC or after the Extended or Extended-2 UIUC as a category index for indicating to which category a single extended IE, out of the two or more extended IEs, being expressed belongs for up to M categories, where $2^{(m-1)} \leq M < 2^m$.

39. The apparatus of claim 38, wherein the instructions are executable by the processor to use n bits after the category index as an IE index for indicating which of the two or more extended IEs is being expressed in the single extended IE in the category for up to N extended IEs, where $2^{(n-1)} \leq N < 2^n$.

40. The apparatus of claim 38, wherein the instructions are executable by the processor to designate 2m−M slots for extended IEs that do not belong to the category, wherein the category index indicates which of the two or more extended IEs is being expressed in the single extended IE.

41. The apparatus of claim 38, wherein the instructions are executable by the processor to specify a length in bytes of data in the single extended IE currently being expressed using 4 bits after the m bits.

42. The apparatus of claim 38, wherein the instructions are executable by the processor to:
specify a data size unit after the m bits; and
specify a size of length after the data size unit, wherein 2 raised to the power of the size of length is the maximum size of unspecified data, such that the two or more extended IEs are dynamically mapped in the MAP message.

43. A computer-program product for conveying control messages in wireless communications, the computer-program product comprising a non-transitory computer-readable medium having instructions stored thereon, the instructions being executable by one or more processors and the instructions comprising:

instructions for expressing two or more extended information elements (IEs) of a MAP message using, in part, a single Extended or Extended-2 Downlink Interval Usage Code (DIUC) or a single Extended or Extended-2 Uplink Interval Usage Code (UIUC);

instructions for setting one or more bits, within the information element (IE), to select at least one of the expressed two or more extended IEs;

instructions for generating an orthogonal frequency-division multiplexing (OFDM) or orthogonal frequency division multiple access (OFDMA) frame having the MAP message with the two or more extended IEs; and instructions for transmitting a signal based on the OFDM or OFDMA frame.

44. The computer-program product of claim 43, wherein the two or more extended IEs are expressed using a single unused Extended or Extended-2 DIUC or a single unused Extended or Extended-2 UIUC according to one or more standards of the Institute of Electrical and Electronics Engineers (IEEE) 802.16 family of standards.

45. The computer-program product of claim 43, wherein the MAP message comprises an uplink (UL) MAP message and the two or more extended IEs are expressed using a single Extended UIUC having a value of 0x1, 0x6, 0xB, 0xC, 0xD, 0xE, or 0xF in hexadecimal.

46. The computer-program product of claim 43, wherein the MAP message comprises an uplink (UL) MAP message and the two or more extended IEs are expressed using a single Extended-2 UIUC having a value of 0x5 in hexadecimal.

47. The computer-program product of claim 43, wherein the MAP message comprises a downlink (DL) MAP message and the two or more extended IEs are expressed using a single Extended DIUC having a value of 0x5, 0x6, 0x9, or 0xE in hexadecimal.

48. The computer-program product of claim 43, wherein the instructions for expressing the two or more extended IEs comprise instructions for using n bits after the Extended or Extended-2 DIUC or after the Extended or Extended-2 UIUC as an index for indicating which of the two or more extended IEs is being expressed in a single extended IE for up to N extended IEs, where $2^{(n-1)} \leq N < 2^n$.

49. The computer-program product of claim 48, wherein N=16 and n=4.

50. The computer-program product of claim 48, further comprising instructions for specifying a length in bytes of data in the single extended IE currently being expressed using 4 bits after the n bits.

51. The computer-program product of claim 48, further comprising:
   instructions for specifying a data size unit after the n bits; and
   instructions for specifying a size of length after the data size unit, wherein 2 raised to the power of the size of length is the maximum size of unspecified data, such that the two or more extended IEs are dynamically mapped in the MAP message.

52. The computer-program product of claim 43, wherein the instructions for expressing the two or more extended IEs comprise instructions for using m bits after the Extended or Extended-2 DIUC or after the Extended or Extended-2 UIUC as a category index for indicating to which category a single extended IE, out of the two or more extended IEs, being expressed belongs for up to M categories, where $2^{\wedge}(m-1) \leq M < 2^{\wedge}m$.

53. The computer-program product of claim 52, further comprising instructions for using n bits after the category index as an IE index for indicating which of the two or more extended IEs is being expressed in the single extended IE in the category for up to N extended IEs, where $2^{\wedge}(n-1) \leq N < 2^{\wedge}n$.

54. The computer-program product of claim 52, further comprising instructions for designating 2m−M slots for extended IEs that do not belong to the category, wherein the category index indicates which of the two or more extended IEs is being expressed in the single extended IE.

55. The computer-program product of claim 52, further comprising instructions for specifying a length in bytes of data in the single extended IE currently being expressed using 4 bits after the m bits.

56. The computer-program product of claim 52, further comprising:
   instructions for specifying a data size unit after the m bits; and
   instructions for specifying a size of length after the data size unit, wherein 2 raised to the power of the size of length is the maximum size of unspecified data, such that the two or more extended IEs are dynamically mapped in the MAP message.

57. A method for conveying control messages in wireless communications, comprising:
   receiving a signal based on an orthogonal frequency-division multiplexing (OFDM) or orthogonal frequency division multiple access (OFDMA) frame;
   extracting a MAP message from the OFDM or OFDMA frame; and
   reading two or more extended information elements (IEs) from the MAP message, wherein the two or more extended IEs have the same Extended or Extended-2 Downlink Interval Usage Code (DIUC) or the same Extended or Extended-2 Uplink Interval Usage Code (UIUC).

58. The method of claim 57, wherein the two or more extended IEs have the same unused Extended or Extended-2 DIUC or the same unused Extended or Extended-2 UIUC according to one or more standards of the Institute of Electrical and Electronics Engineers (IEEE) 802.16 family of standards.

59. The method of claim 57, wherein the MAP message comprises an uplink (UL) MAP message and the two or more extended IEs have the same Extended UIUC having a value of 0x1, 0x6, 0xB, 0xC, 0xD, 0xE, or 0xF in hexadecimal.

60. The method of claim 57, wherein the MAP message comprises an uplink (UL) MAP message and the two or more extended IEs have the same Extended-2 UIUC having a value of 0x5 in hexadecimal.

61. The method of claim 57, wherein the MAP message comprises a downlink (DL) MAP message and the two or more extended IEs have the same Extended DIUC having a value of 0x5, 0x6, 0x9, or 0xE in hexadecimal.

62. The method of claim 57, wherein reading the two or more extended IEs comprises reading n bits after the Extended or Extended-2 DIUC or after the Extended or Extended-2 UIUC as an index to distinguish which of the two or more extended IEs is being read as a single extended IE.

63. The method of claim 62, further comprising reading, after the n bits, a length in bytes of data in the single extended IE currently being read.

64. The method of claim 62, further comprising:
   reading a data size unit after the n bits; and
   reading a size of length after the data size unit, wherein 2 raised to the power of the size of length is the maximum size of unspecified data.

65. The method of any of claim 57, wherein reading the two or more extended IEs comprises reading m bits after the Extended or Extended-2 DIUC or after the Extended or Extended-2 UIUC as a category index to distinguish which category a single extended IE, out of the two or more extended IEs, being read belongs for up to M categories, where $2^{\wedge}(m-1) \leq M < 2^{\wedge}m$.

66. The method of claim 65, further comprising reading n bits after the category index as an IE index to distinguish which of the two or more extended IEs is being read as the single extended IE in the category.

67. The method of claim 65, wherein reading the two or more extended IEs comprises reading one of 2m−M slots for extended IEs that do not belong to the category, wherein the category index distinguishes which of the two or more extended IEs is being read as the single extended IE.

68. The method of claim 65, further comprising reading, after the m bits, a length in bytes of data in the single extended IE currently being read.

69. The method of claim 65, further comprising:
   reading a data size unit after the m bits; and
   reading a size of length after the data size unit, wherein 2 raised to the power of the size of length is the maximum size of unspecified data.

70. An apparatus for conveying control messages in wireless communications, comprising:
   means for receiving a signal based on an orthogonal frequency-division multiplexing (OFDM) or orthogonal frequency division multiple access (OFDMA) frame;
   means for extracting a MAP message from the OFDM or OFDMA frame; and
   means for reading two or more extended information elements (IEs) from the MAP message, wherein the two or more extended IEs have the same Extended or Extended-2 Downlink Interval Usage Code (DIUC) or the same Extended or Extended-2 Uplink Interval Usage Code (UIUC).

71. The apparatus of claim 70, wherein the two or more extended IEs have the same unused Extended or Extended-2 DIUC or the same Extended or Extended-2 UIUC according to one or more standards of the Institute of Electrical and Electronics Engineers (IEEE) 802.16 family of standards.

72. The apparatus of claim 70, wherein the MAP message comprises an uplink (UL) MAP message and the two or more extended IEs have the same Extended UIUC having a value of 0x1, 0x6, 0xB, 0xC, 0xD, 0xE, or 0xF in hexadecimal.

73. The apparatus of claim 70, wherein the MAP message comprises an uplink (UL) MAP message and the two or more extended IEs have the same Extended-2 UIUC having a value of 0x5 in hexadecimal.

74. The apparatus of claim 70, wherein the MAP message comprises a downlink (DL) MAP message and the two or more extended IEs have the same Extended DIUC having a value of 0x5, 0x6, 0x9, or 0xE in hexadecimal.

75. The apparatus of claim 70, wherein n bits are read after the Extended or Extended-2 DIUC or after the Extended or Extended-2 UIUC as an index to distinguish which of the two or more extended IEs is being read as a single extended IE.

76. The apparatus of claim 75, wherein, after the n bits, a length in bytes of data in the single extended IE currently being read are read.

77. The apparatus of claim 75, wherein:
a data size unit is read after the n bits; and
a size of length is read after the data size unit, wherein 2 raised to the power of the size of length is the maximum size of unspecified data.

78. The apparatus of claim 70, wherein m bits are read after the Extended or Extended-2 DIUC or after the Extended or Extended-2 UIUC as a category index to distinguish which category a single extended IE, out of the two or more extended IEs, being read belongs for up to M categories, where $2^{(m-1)} \leq M < 2^m$.

79. The apparatus of claim 78, wherein n bits are read after the category index as an IE index to distinguish which of the two or more extended IEs is being read as the single extended IE in the category.

80. The apparatus of claim 78, wherein one of 2m−M slots for extended IEs that do not belong to the category are read, wherein the category index distinguishes which of the two or more extended IEs is being read as the single extended IE.

81. The apparatus of claim 78, wherein, after the m bits, a length in bytes of data in the single extended IE currently being read is read.

82. The apparatus of claim 78, wherein:
a data size unit is read after the m bits; and
a size of length is read after the data size unit, wherein 2 raised to the power of the size of length is the maximum size of unspecified data.

83. An apparatus for conveying control messages in wireless communications, comprising:
a processor;
memory in electronic communication with the processor;
instructions stored in the memory, the instructions being executable by the processor to:
receive a signal based on an orthogonal frequency-division multiplexing (OFDM) or orthogonal frequency division multiple access (OFDMA) frame;
extract a MAP message from the OFDM or OFDMA frame; and
read two or more extended information elements (IEs) from the MAP message, wherein the two or more extended IEs have the same Extended or Extended-2 Downlink Interval Usage Code (DIUC) or the same Extended or Extended-2 Uplink Interval Usage Code (UIUC).

84. The apparatus of claim 83, wherein the two or more extended IEs have the same unused Extended or Extended-2 DIUC or the same Extended or Extended-2 UIUC according to one or more standards of the Institute of Electrical and Electronics Engineers (IEEE) 802.16 family of standards.

85. The apparatus of claim 83, wherein the MAP message comprises an uplink (UL) MAP message and the two or more extended IEs have the same Extended UIUC having a value of 0x1, 0x6, 0xB, 0xC, 0xD, 0xE, or 0xF in hexadecimal.

86. The apparatus of claim 83, wherein the MAP message comprises an uplink (UL) MAP message and the two or more extended IEs have the same Extended-2 UIUC having a value of 0x5 in hexadecimal.

87. The apparatus of claim 83, wherein the MAP message comprises a downlink (DL) MAP message and the two or more extended IEs have the same Extended DIUC having a value of 0x5, 0x6, 0x9, or 0xE in hexadecimal.

88. The apparatus of claim 83, wherein the instructions are executable by the processor to read n bits after the Extended or Extended-2 DIUC or after the Extended or Extended-2 UIUC as an index to distinguish which of the two or more extended IEs is being read as a single extended IE.

89. The apparatus of claim 88, wherein the instructions are executable by the processor to read, after the n bits, a length in bytes of data in the single extended IE currently being read.

90. The apparatus of claim 88, wherein the instructions are executable by the processor to:
read a data size unit after the n bits; and
read a size of length after the data size unit, wherein 2 raised to the power of the size of length is the maximum size of unspecified data.

91. The apparatus of claim 83, wherein the instructions are executable by the processor to read m bits after the Extended or Extended-2 DIUC or after the Extended or Extended-2 UIUC as a category index to distinguish which category a single extended IE, out of the two or more extended IEs, being read belongs for up to M categories, where $2^{(m-1)} \leq M < 2^m$.

92. The apparatus of claim 91, wherein the instructions are executable by the processor to read n bits after the category index as an IE index to distinguish which of the two or more extended IEs is being read as the single extended IE in the category.

93. The apparatus of claim 91, wherein the instructions are executable by the processor to read one of 2m−M slots for extended IEs that do not belong to the category, wherein the category index distinguishes which of the two or more extended IEs is being read as the single extended IE.

94. The apparatus of claim 91, wherein the instructions are executable by the processor to read, after the m bits, a length in bytes of data in the single extended IE currently being read.

95. The apparatus of claim 91, wherein the instructions are executable by the processor to:
read a data size unit after the m bits; and
read a size of length after the data size unit, wherein 2 raised to the power of the size of length is the maximum size of unspecified data.

96. A computer-program product for conveying control messages in wireless communications, the computer-program product comprising a non-transitory computer-readable medium having instructions stored thereon, the instructions being executable by one or more processors and the instructions comprising:
instructions for receiving a signal based on an orthogonal frequency-division multiplexing (OFDM) or orthogonal frequency division multiple access (OFDMA) frame;
instructions for extracting a MAP message from the OFDM or OFDMA frame; and
instructions for reading two or more extended information elements (IEs) from the MAP message, wherein the two or more extended IEs have the same Extended or Extended-2 Downlink Interval Usage Code (DIUC) or the same Extended or Extended-2 Uplink Interval Usage Code (UIUC).

97. The computer-program product of claim 96, wherein the two or more extended IEs have the same unused Extended or Extended-2 DIUC or the same unused Extended or Extended-2 UIUC according to one or more standards of the Institute of Electrical and Electronics Engineers (IEEE) 802.16 family of standards.

98. The computer-program product of claim 96, wherein the MAP message comprises an uplink (UL) MAP message and the two or more extended IEs have the same Extended UIUC having a value of 0x1, 0x6, 0xB, 0xC, 0xD, 0xE, or 0xF in hexadecimal.

99. The computer-program product of claim 96, wherein the MAP message comprises an uplink (UL) MAP message and the two or more extended IEs have the same Extended-2 UIUC having a value of 0x5 in hexadecimal.

100. The computer-program product of claim 96, wherein the MAP message comprises a downlink (DL) MAP message and the two or more extended IEs have the same Extended DIUC having a value of 0x5, 0x6, 0x9, or 0xE in hexadecimal.

101. The computer-program product of claim 96, wherein the instructions for reading the two or more extended IEs comprise instructions for reading n bits after the Extended or Extended-2 DIUC or the Extended or Extended-2 UIUC as an index to distinguish which of the two or more extended IEs is being read as a single extended IE.

102. The computer-program product of claim 101, further comprising instructions for reading, after the n bits, a length in bytes of data in the single extended IE currently being read.

103. The computer-program product of claim 101, further comprising:
instructions for reading a data size unit after the n bits; and
instructions for reading a size of length after the data size unit, wherein 2 raised to the power of the size of length is the maximum size of unspecified data.

104. The computer-program product of claim 96, wherein the instructions for reading the two or more extended IEs comprise instructions for reading m bits after the Extended or Extended-2 DIUC or after the Extended or Extended-2 UIUC as a category index to distinguish which category a single extended IE, out of the two or more extended IEs, being read belongs for up to M categories, where $2^{(m-1)} \leq M < 2^m$.

105. The computer-program product of claim 104, further comprising instructions for reading n bits after the category index as an IE index to distinguish which of the two or more extended IEs is being read as the single extended IE in the category.

106. The computer-program product of claim 104, wherein the instructions for reading the two or more extended IEs comprise instructions for reading one of 2m−M slots for extended IEs that do not belong to the category, wherein the category index distinguishes which of the two or more extended IEs is being read as the single extended IE.

107. The computer-program product of claim 104, further comprising instructions for reading, after the m bits, a length in bytes of data in the single extended IE currently being read.

108. The computer-program product of claim 104, further comprising:
instructions for reading a data size unit after the m bits; and
instructions for reading a size of length after the data size unit, wherein 2 raised to the power of the size of length is the maximum size of unspecified data.

* * * * *